US012707549B2

(12) United States Patent
Garner et al.

(10) Patent No.: US 12,707,549 B2
(45) Date of Patent: Aug. 11, 2026

(54) LIGHT SOURCE CALIBRATION

(71) Applicant: Roku, Inc., San Jose, CA (US)

(72) Inventors: Gregory Garner, Key Colony Beach, FL (US); Soren Riise, Templeton, CA (US); David Lee Stern, Los Gatos, CA (US); Patrick Brouillette, Tempe, AZ (US); Robert Caston Curtis, Napa, CA (US)

(73) Assignee: Roku, Inc., San Jose, CA (US)

( * ) Notice: Subject to any disclaimer, the term of this patent is extended or adjusted under 35 U.S.C. 154(b) by 41 days.

(21) Appl. No.: 18/804,534

(22) Filed: Aug. 14, 2024

(65) Prior Publication Data

US 2026/0052614 A1 Feb. 19, 2026

(51) Int. Cl.
*H05B 47/17* (2020.01)

(52) U.S. Cl.
CPC .................................... *H05B 47/17* (2020.01)

(58) Field of Classification Search
None
See application file for complete search history.

(56) References Cited

U.S. PATENT DOCUMENTS 5,430,356 A * 7/1995 Ference ................. H05B 39/08 315/307
6,025,679 A 2/2000 Harper et al.
8,076,869 B2 * 12/2011 Shatford ................ H05B 45/56 315/315
10,264,638 B2 * 4/2019 Cash ...................... H05B 45/24
11,375,588 B1 * 6/2022 Garner ................... H05B 45/12
2007/0120653 A1 * 5/2007 Paton .................. H05B 47/196 340/301
2007/0185675 A1 * 8/2007 Papamichael ....... F21V 23/0442 702/85
2012/0105402 A1 5/2012 Huang
(Continued)

FOREIGN PATENT DOCUMENTS

WO 2020251109 A1 12/2020

OTHER PUBLICATIONS

International Search Report and Written Opinion, dated Dec. 19, 2025, for the corresponding International Application No. PCT/US2025/041710, 8 pages.

*Primary Examiner* — Srinivas Sathiraju
(74) *Attorney, Agent, or Firm* — Straylight LLP

(57) ABSTRACT

System and techniques are provided for calibrating lighting systems. An example method can include determining, based on data from a sensor in a scene, different light outputs generated by a light source in the scene, the different light outputs including brightness, intensity, and/or color levels; determining a curve plotting a relationship between the different light outputs and different dimming inputs used to control the light source; based on the curve, mapping the different dimming inputs to control signals configured to trigger the light source to generate the different light outputs, the mapping correlating each dimming input to a light output and a control signal configured to trigger the light source to generate the light output; and based on the mapping, calibrating each dimming input to control the light source to generate the light output associated with that dimming input based on the control signal correlated to that dimming input.

17 Claims, 9 Drawing Sheets

(56) References Cited

U.S. PATENT DOCUMENTS

| | | | | |
|---|---|---|---|---|
| 2014/0184096 | A1* | 7/2014 | Ng | H05B 45/46 315/296 |
| 2014/0197750 | A1* | 7/2014 | Cash | H05B 45/20 315/192 |
| 2014/0265882 | A1* | 9/2014 | Laski | H05B 45/24 315/158 |
| 2016/0192458 | A1* | 6/2016 | Keith | H05B 41/39 315/291 |
| 2016/0192461 | A1* | 6/2016 | Minsky | H05B 47/135 315/294 |
| 2017/0013692 | A1* | 1/2017 | Bewick | H05B 45/20 |
| 2017/0245347 | A1* | 8/2017 | Zhou | H05B 47/11 |
| 2021/0345471 | A1 | 11/2021 | Eisele et al. | |
| 2023/0027299 | A1 | 1/2023 | Xu et al. | |
| 2023/0130313 | A1* | 4/2023 | Kuo | B41J 2/45 347/247 |
| 2024/0224399 | A1* | 7/2024 | Gomm | H05B 47/19 |

* cited by examiner

LIGHT SOURCE CALIBRATION

BACKGROUND

Field

This disclosure is generally directed to lightning systems and, more particularly, to calibration of dimming inputs and associated outputs from light sources.

SUMMARY

Provided herein are system, apparatus, article of manufacture, method and/or computer program product embodiments (and/or combinations and/or sub-combinations thereof) for controlling and calibrating outputs from dimmable and/or color-changing light sources. A light source (e.g., a lamp, bulb, light emitting diode, or other illumination device) can include various types of electric lighting technologies such as, for example and without limitation, a light emitting diode (LED) light, an incandescent light, a halogen light, a metal halide light, a fluorescent light, among others.

In some aspects, a method is provided for controlling and calibrating outputs from dimmable and/or color-changing light sources. An example method can include determining, based on sensor data from one or more sensors in a scene, different light outputs generated by a light source in the scene, the different light outputs including different brightness levels, different intensity levels, and/or different color levels; determining a curve plotting a relationship between the different light outputs and different dimming inputs used to control the light source; based on the curve plotting the relationship between the different light outputs and the different dimming inputs, mapping the different dimming inputs to respective control signals configured to trigger the light source to generate the different light outputs. The mapping of the different dimming inputs to respective control signals can correlate each dimming input to a respective light output and a respective control signal configured to trigger the light source to generate the respective light output. The method can also include based on the mapping of the different dimming inputs to the respective control signals, calibrating each dimming input from the different dimming inputs to control the light source to generate the respective light output associated with that dimming input based on the respective control signal correlated to that dimming input.

In some aspects, a system is provided for controlling and calibrating outputs from dimmable and/or color-changing light sources. In some examples, the system can include a light source, a dimmer device, circuitry, a light switch, and/or a controller(s) or computing device(s), such as a server computer, a desktop computer, a media device, an Internet-of-Things (IoT) device, a peripheral device, a mobile device (e.g., a laptop computer, a tablet computer, a mobile phone or smartphone, etc.), a wearable computing device (e.g., a smartwatch, smartglasses, a head-mounted display (HMD), an extended reality (e.g., virtual reality, augmented reality, mixed reality, virtual reality with video passthrough, etc.) device, etc.), a single-board computer (SBC) or system-on-chip (SoC) device, an edge device, a smart device (e.g., a smart television, a smart appliance, etc.), among others.

The system can include memory used to store data, such as computing instructions, and one or more processors coupled to the memory and configured to perform operations including determining, based on sensor data from one or more sensors in a scene, different light outputs generated by a light source in the scene, the different light outputs including different brightness levels, different intensity levels, and/or different color levels; determining a curve plotting a relationship between the different light outputs and different dimming inputs used to control the light source; based on the curve plotting the relationship between the different light outputs and the different dimming inputs, mapping the different dimming inputs to respective control signals configured to trigger the light source to generate the different light outputs. The mapping of the different dimming inputs to respective control signals can correlate each dimming input to a respective light output and a respective control signal configured to trigger the light source to generate the respective light output. The operations can also include based on the mapping of the different dimming inputs to the respective control signals, calibrating each dimming input from the different dimming inputs to control the light source to generate the respective light output associated with that dimming input based on the respective control signal correlated to that dimming input.

In some aspects, a non-transitory computer-readable medium is provided for controlling and calibrating outputs from dimmable and/or color-changing light sources. In some cases, the non-transitory computer-readable medium can have instructions stored thereon that, when executed by one or more processors, cause the one or more processors to perform operations including determining, based on sensor data from one or more sensors in a scene, different light outputs generated by a light source in the scene, the different light outputs including different brightness levels, different intensity levels, and/or different color levels; determining a curve plotting a relationship between the different light outputs and different dimming inputs used to control the light source; based on the curve plotting the relationship between the different light outputs and the different dimming inputs, mapping the different dimming inputs to respective control signals configured to trigger the light source to generate the different light outputs. The mapping of the different dimming inputs to respective control signals can correlate each dimming input to a respective light output and a respective control signal configured to trigger the light source to generate the respective light output. The operations can also include based on the mapping of the different dimming inputs to the respective control signals, calibrating each dimming input from the different dimming inputs to control the light source to generate the respective light output associated with that dimming input based on the respective control signal correlated to that dimming input.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
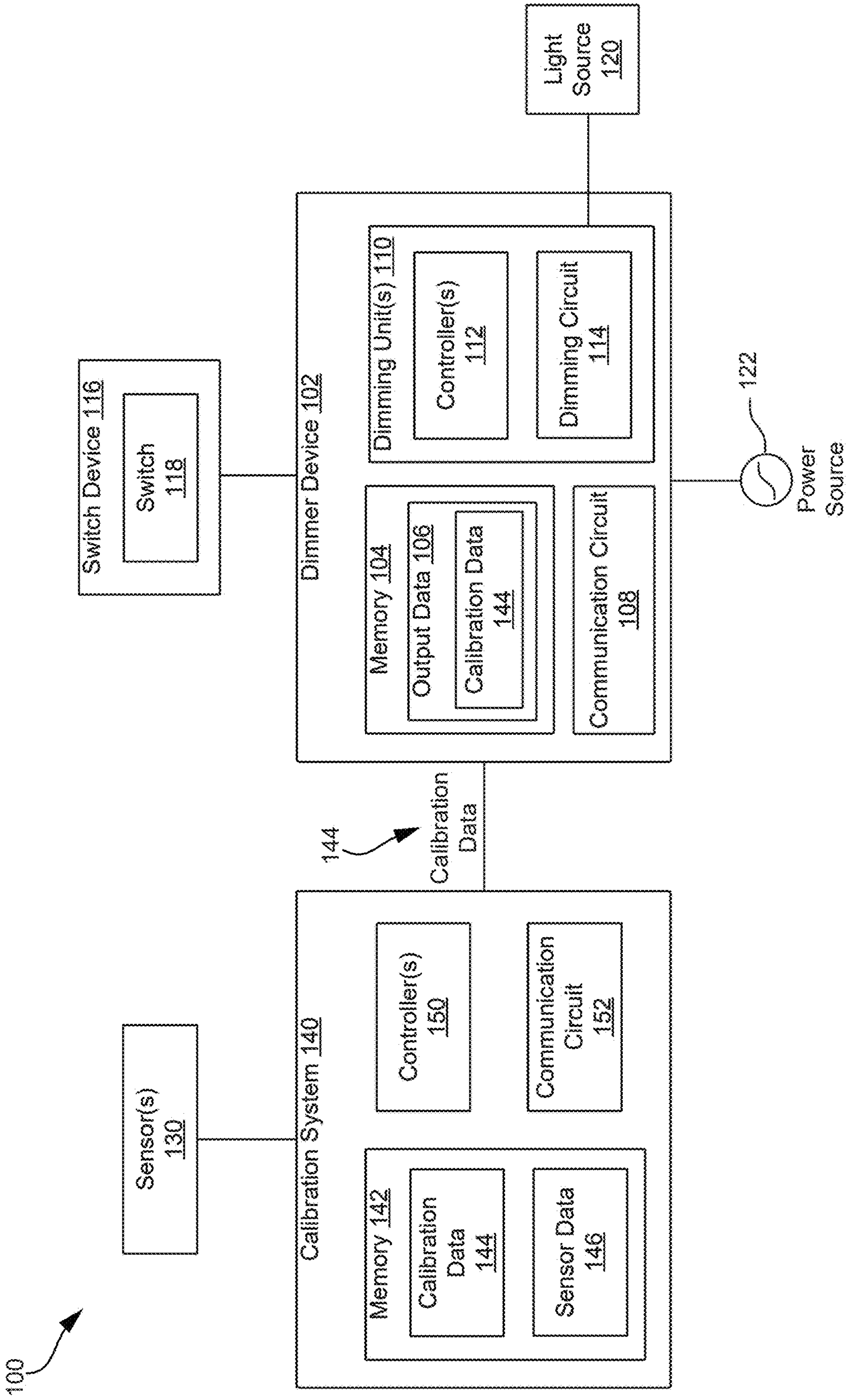
FIGS. 1A and 1B are diagrams illustrating example lighting systems including a dimmer device and a light source that can be controlled and calibrated using sensor data, according to some examples of the present disclosure.

Light sources (e.g., lamps, bulbs, light emitting diodes, illumination devices, etc.) are commonly used to provide light in scenes and devices. There are various types of light sources and associated lighting technologies such as, for example and without limitation, light emitting diode (LED) lights, incandescent lights, halogen lights, metal halide lights, and fluorescent lights, among others. In addition to traditional lighting capabilities, some light sources also have dimming and/or color changing capabilities, which allow a user to change the intensity, brightness, and/or color of light emitted by such light sources. For example, a dimming level of a light source can be adjusted to vary the intensity and brightness of the light emitted by the light source. The dimming level of the light source can be adjusted to a desired level between a maximum output level (e.g., a fully on level or maximum brightness and intensity level) to an off or minimum output level.

In some cases, a dimmer device can be used to perform dimming control functions for one or more light sources. There are various types of dimmer devices that can be used to perform such dimming functions. However, controlling the outputs (e.g., the dimming levels, the color outputs, etc.) of a light source can be challenging and often imprecise. For example, the relationship between a dimming input (e.g., an input used to set the color, brightness levels, and/or intensity levels) used to set or control the output levels (e.g., brightness levels, intensity levels, color levels, etc.) of a light source and the actual output levels emitted by the light source is not linear. To illustrate, the rate of change of brightness/intensity levels emitted by a dimmable light source in response to a dimming input can drastically vary from (e.g., is not linear relative to) the rate of change of brightness/intensity levels associated with the dimming input (e.g., the brightness/intensity levels that the dimming input is expected to set at the dimmable light source). Similarly, the rate of change of color levels emitted by a color-changing light source in response to a dimming input can drastically vary from (e.g., is not linear relative to) the rate of change of color levels associated with the dimming input.

As an example, the possible dimming inputs at an input element that controls a light source (e.g., a switch coupled to a dimmer, an application) can specify respective output levels of 0 through 10, for example, meaning that such dimming inputs are supposed to set the output levels of the light source from an output level of 0 to an output level of 10, depending on the dimming input. However, the output levels associated with some dimming inputs may trigger a disproportionate response from the light source. To illustrate, while a dimming input associated with an output level of, for example, 4 may trigger the light source to emit light with an output level of around 4, a dimming input associated with an output level of, for example, 3 may trigger the light source to emit light with an output level well below 3, such as 0 or 1. In many cases, the lowest and/or highest output levels that can be set at an input device used to control a light source can result in significantly disproportionate changes in the actual output levels of the light source relative to other output levels that can be set at the input device.

As a result, when the user provides a dimming input to control the output levels of a light source, the output levels that the user expects to set on the light source via the dimming input may not match or may not be proportionate to the actual output levels emitted by the light source in response to such dimming input. Moreover, such irregular, disproportionate, and inconsistent behavior and performance of dimmable and color-changing light sources can be undesirable, inconvenient, and difficult to manage, control, and improve.

Another issue faced by the lighting industry is flicker, which can refer to variations of luminance in time. Flicker may be inherent to the design of a light source and/or can be introduced by external factors. In general, there are various types of flicker, including visible and invisible flicker. Visible flicker includes flicker that is visible to, and observed by, humans and is typically considered undesirable except in a limited set of special applications such as stroboscopic light applications. Invisible flicker includes flicker that is not visible or perceived by humans but may still have effects (e.g., biological or even health effects) on humans such as distraction, reduced visual task performance, unstable light output in video applications, and apparent slowing or stopping of motion (stroboscopic effect).

Provided herein are system, apparatus, device, method (also referred to as a process) and/or computer program product embodiments, combinations and/or sub-combinations thereof (also referred to as "systems and techniques" hereinafter) for controlling dimmer devices and calibrating outputs from the dimmer devices and associated light sources. In some aspects, the systems and techniques described herein can be used to create a more linear and/or proportional relationship between the output levels (e.g., brightness levels, intensity levels, color levels, etc.) of dimmable and/or color-changing light sources and the inputs (e.g., the input level on or from a switch, an application, and/or dimmer device) used to control the output levels generated by the dimmable and/or color-changing light sources.

For example, the systems and techniques described herein can be used to calibrate inputs (e.g., switch and/or dimmer device inputs, associated control signals, etc.) used to control output levels generated by a dimmable and/or color-changing light source so that the inputs used to control the light source triggers the light source to generate the output levels expected in response to such inputs. In other words, the inputs used to control the output levels oof the light source can be calibrated so the output levels set via the inputs match the actual output levels generated by the light source in response to such inputs, or so the output levels set via the inputs are linearly or proportionally related to the actual output levels generated by the light source in response to such inputs.

To illustrate, rather than correlating the output levels associated with the control signals from a dimmer used to control a light source to the output levels associated with the power signals (e.g., voltage/current) generated from such control signals and used to control the light source, the systems and techniques described herein can be used to calibrate the output levels of the inputs used to control the light source with the actual output levels generated by the light source, in order to ensure that the output levels that inputs used to control the light source are supposed to trigger at the light source correspond to (e.g., match or are linearly or proportionally related to) the actual output levels generated by the light source in response to such inputs. In other words, rather than mapping the control signals from a dimmer to the power signals (e.g., voltage/current) generated from the control signals and provided to the light source to control the light source, the inputs (and/or the associated output levels) set at a device or application used to control the light source can be mapped to the actual output levels of the light source in a matching, linear, or proportionate fashion, so the inputs used to control the light source result in the output levels expected from the light source in response to such inputs.

As an example, assume that a dimmer element, such as a dimmer switch or a dimmer device, used to control a light source includes a set of input options corresponding to output levels 0 through 10. Generally, when the dimmer element receives an input for setting the output levels of the light source to a particular output level, the input is used to generate a control signal which is translated to a power signal provided to the light source to control the output levels of the light source. In such cases, the output levels from the light source correlate to the power signal provided to the light source, but the output level associated with the input used to generate the control signal may not be as linear or proportionate to the actual output level generated by the light source based on such input. On the other hand, the systems and techniques described herein can calibrate the input levels (e.g., output levels 0 through 10 in the previous example) and/or associated signals such that the input levels and associated signals correspond to (e.g., match or are linearly or proportionally related to) the actual output levels (e.g., brightness levels, intensity levels, color levels, etc.) generated by the light source based on the input levels. The systems and techniques described herein can use one or more sensors to measure the output levels generated by a light source and use the measured output levels to calibrate the inputs used to control the light source so the output levels associated with the inputs are based on actual output levels of the light source. This way, the inputs used to control a light source can trigger the light source to generate the actual output levels expected from such inputs and/or are more correlated (e.g., linear/proportional) to the output levels generated by the light source from such inputs.

As previously explained, the calibration of dimming inputs and/or associated signals can be done based on sensor data. The sensor data can measure, depict, and/or describe the properties (e.g., output levels) of outputs from the light source, such as brightness levels, intensity levels, color properties and/or levels, etc. For example, the systems and techniques described herein can collect sensor data describing, depicting, and/or measuring outputs from a light source in a scene. The systems and techniques described herein can use the sensor data to correlate or map the output levels (e.g., brightness levels, intensity levels, color levels, etc.) from the light source with dimming inputs (and/or associated output levels) used to control the light source and/or corresponding signals used to control the light source. The systems and techniques described herein can determine what output levels from the light source should be correlated or mapped to what dimming inputs and/or corresponding signals, in order to produce a more linear and/or proportional relationship between the output levels of the light source and the dimming inputs and/or corresponding signals used to trigger such outputs from the light source. The systems and techniques described herein can use the mapping to calibrate the dimming inputs and/or corresponding signals used to trigger outputs from the light source so as to produce output levels from the light source that are more proportionate and/or linearly related to the calibrated dimming inputs or control signals.

In some cases, the systems and techniques described herein can generate an output curve that maps dimming inputs and/or corresponding signals used to trigger outputs from a light source to the output levels generated by the light source. The output curve can provide a more linear and/or proportionate relationship between the output levels of the light source and the dimming inputs and/or corresponding signals used to trigger such output levels. The systems and techniques described herein can use the output curve to calibrate the dimming inputs and/or corresponding signals for the light source to create a more linear and/or proportionate relationship between the dimming inputs and/or corresponding signals and the output levels from the light source. In some examples, the systems and techniques described herein can use the sensor data, outputs from the light source measured by the sensor data, and the dimming inputs and/or corresponding signals to map the dimming inputs and/or corresponding signals to the output levels from the light source. The systems and techniques described herein can adjust a mapping of dimming inputs and/or corresponding signals to output levels from the light source based on an output curve generated for the light source. The mapping can provide a more linear and/or proportional relationship between the dimming inputs and/or corresponding signals used to control the light source and the output levels from the light source.

The systems and techniques described herein can obtain such sensor data from one or more sensors in the scene. Non-limiting examples of sensors that can be used to collect such sensor data can include ambient light sensors, color sensors, photodiodes or photodiode sensors, phototransistors, image/camera sensors, and/or any other type of light sensor. The systems and techniques described herein can obtain the sensor data from a single sensor in the scene or multiple sensors in the scene. In some examples, the one or more sensors used to collect the sensor data can include a sensor implemented by or integrated into the dimmer device, the light source, and/or a separate device, such as a mobile computing device (e.g., a mobile phone, a tablet computer, a laptop computer, etc.), a television, an IoT device, a camera system, a monitor, a computer, a smart wearable device, and/or any other device. In some cases, the one or more sensors used to collect the sensor data can additionally or alternatively include a standalone sensor such as a camera device or a standalone light sensor in the scene.

In some examples, the systems and techniques described herein can be used to correct flicker produced by a light source. For example, the sensor data collected by one or more sensors in the scene can be used to detect flicker and the output levels associated with the flicker. The systems and techniques described herein can then map the flicker and output levels associated with the flicker to signals used to trigger the light source to generate the output levels associated with the flicker. The system and techniques described herein can use the mapping to identify the signals that result in flicker in order to prevent the flicker. In some examples, the systems and techniques described herein can prevent the flicker by adjusting the range of signals used to control the light source to exclude any signals that result in such flicker.

Figure 1B:
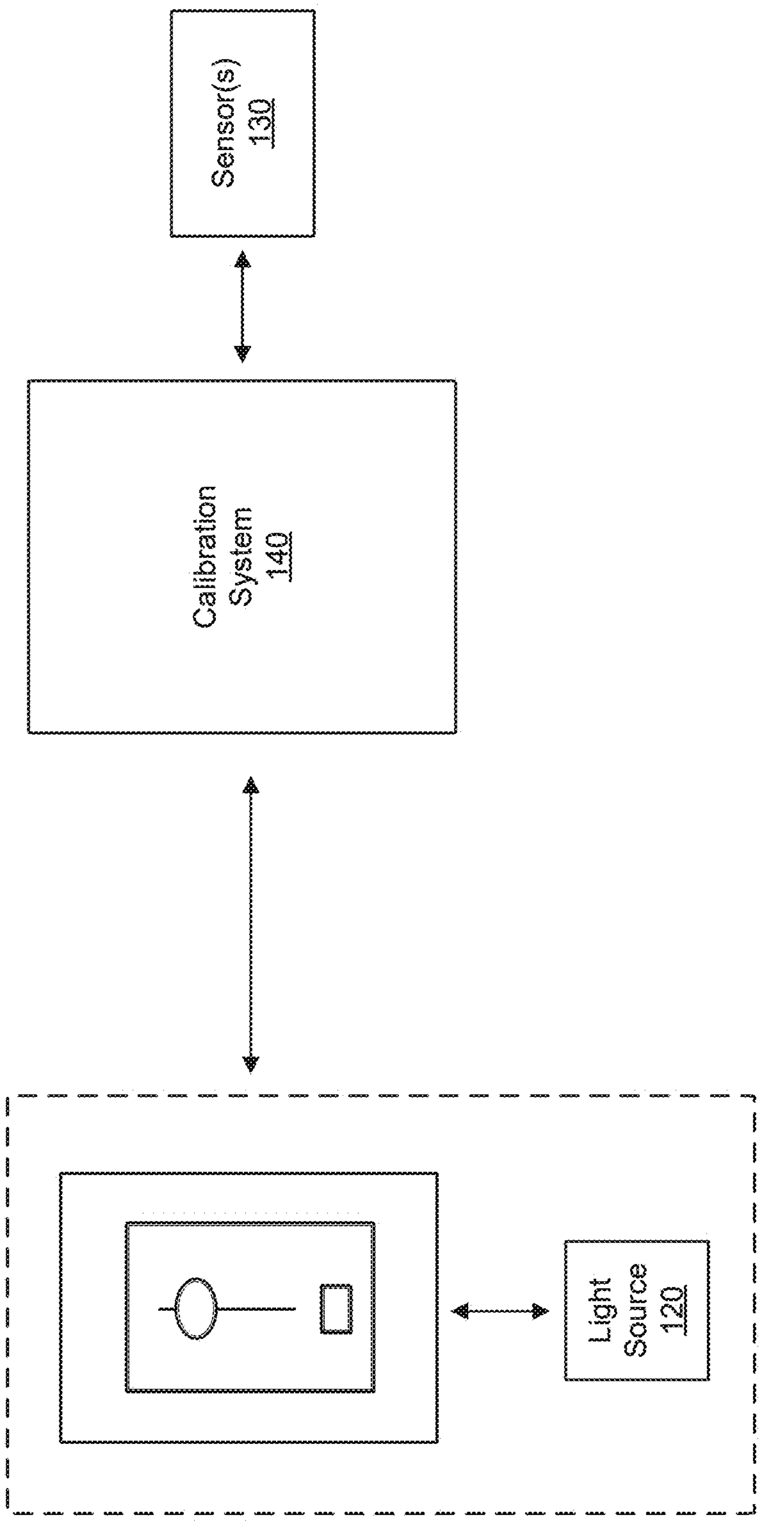

Various embodiments and aspects of this disclosure may be implemented using and/or may be part of the lighting system 100 shown in FIG. 1A or FIG. 1B. It is noted, however, that the lighting system 100 is provided solely for illustrative purposes and is not limiting. Examples and embodiments of this disclosure may be implemented using, and/or may be part of, lighting systems and environments that are different from and/or in addition to the lighting system 100, as will be appreciated by persons skilled in the relevant art(s) based on the teachings contained herein. An example of the lighting system 100 shall now be described.

Example Lighting System

FIGS. 1A-1B illustrate block diagrams of an example lighting system, according to some examples of the present disclosure. With reference to FIG. 1A, an example lighting system 100 can include a dimmer device (e.g., a hardware and/or software/virtual dimmer device) that can be used to adjust the output levels (e.g., brightness, intensity, color) of light emitted by a dimmable and/or color-changing light source 120, according to some examples of the present disclosure. In some examples, the lighting system 100 can be directed to calibration and control of dimmable and/or color-changing light sources and associated input devices. However, this disclosure is applicable to any type of other light sources and/or light source configurations (instead of or in addition to dimmable and/or color-changing light sources), as well as any mechanism, means, protocol, method and/or process for calibrating and controlling light sources. Moreover, examples and aspects of this disclosure may be implemented using and/or may be part of lighting systems different from and/or in addition to the lighting system 100, as will be appreciated by persons skilled in the relevant art(s) based on the teachings contained herein. An example of lighting system 100 shall now be described.

The lighting system 100 can be implemented, integrated, and/or located/placed in any indoor and/or outdoor location. To illustrate, the lightning system 100 can be implemented, integrated, and/or located/placed in, for example and without limitation, a room (e.g., a bedroom, a kitchen, a living room, a basement, an office room, an entertainment or television room, a guestroom, a work room, etc.), a hallway, a garage, a patio, a backyard and/or front yard, a stage or studio lighting area, an office building, a government building, a business locale, an industrial space, a hospital, a classroom or school, a transportation system (e.g., a vehicle, an airplane, a train, a boat, etc.), a conference room, a hall or concert hall, a stairwell, an ingress or egress area, a driveway, a shed, a street, a park, a construction zone, a gymnasium, a locker room, a barn, an airport, and/or any other location.

The lighting system 100 can include a light source 120 controlled by a dimmer device 102. The light source 120 can include or represent any light-emitting device or devices with dimming and/or color changing capabilities. For example, the light source 120 can include, without limitation, a light emitting diode (LED) light, an incandescent light, a halogen light, a metal halide light, a fluorescent light, and/or any other type of light.

In some examples, the dimmer device 102 can include or represent a physical/hardware dimmer device. In such examples, the dimmer device can be implemented by a single device with the dimmer capabilities described herein, or across multiple devices used to provide the dimmer capabilities described herein, such as a distributed dimmer device or multiple dimmer devices. In other examples, the dimmer device 102 can additionally or alternatively include or represent a software/virtual dimmer device such as a dimmer application or gadget configured to control one or more hardware devices used to provide the dimmer capabilities described herein.

In the example shown in FIG. 1A, the lighting system 100 can include a switch device 116 that includes or is coupled to a switch 118 used to control operations and outputs of the light source 120, such as turning off the light source 120, turning on the light source 120, setting or adjusting an output level and/or property of the light source 120, etc.

The switch 118 can be or include a mechanical switch and/or a virtual/software switch. Moreover, the switch 118 can include or represent a single switch or a plurality of switches. In some examples, the switch 118 can serve as an operation unit for turning on/off the light source 120, changing a dimming level of the light source 120, and/or changing a color of light emitted by the light source 120. When the switch 118 is operated, the switch 118 can send a signal corresponding to the operation of the switch 118 to the switch device 116 (or a component thereof such as, for example, a switch controller). In some examples, the signal can indicate or correspond to a position of the switch 118, such as the position of the switch 118 shown in FIG. 1B. Based on the signal from the switch 118, the switch device 116 can provide a corresponding signal to be processed by the dimmer device 102. In some aspects, a calibration system 140 can provide additional control to and/or data to the dimmer device 102 in addition to the switch device 116 and the switch 118.

In some examples, the switch device 116 can be electrically coupled to a power source (not shown), which can supply power to one or more devices electrically coupled to the switch device 116. Moreover, the switch 118 can be coupled to the dimmer device 102 through the switch device 116 and/or a component of the switch device 116, such as a switch controller and/or circuit. The dimmer device 102 can be electrically coupled to a power source 122 that can supply power to the dimmer device 102. In some examples, as further described herein, the dimmer device 102 can include various components, such as a memory 104, a communication circuit 108, and a dimming unit(s) 110 that includes a controller(s) 112 and a dimming circuit 114. In other examples, the dimmer device 102 may only include a mechanical switch as shown in FIG. 1B.

In some examples, the dimmer device 102 can include a 2-way dimmer switch, a triode for alternating current (TRIAC) dimmer switch, an Electronic Low Voltage (ELV) dimmer switch, a 3-way dimmer switch, a 4-way dimmer switch, or any other dimmer device. The dimmer device 102 can turn on the light source 120 using power supplied from the power source 122, turn off the light source 120 by not providing or blocking power to the light source 120 (e.g., stop providing power to the light source 120), and/or adjust an output of the light source 120 by adjusting the power supplied to the light source 120.

The dimmer device 102 can receive a signal from the switch device 116 and use the signal to control the light source 120, such as trigger the light source 120 to emit light with certain properties (e.g., output levels). In some examples, the dimmer device 102 can use output data 106 to control the light source 120 and/or determine how to control the light source 120, which can include calibration data 144 (or a portion thereof) from the calibration system 140 (and can optionally include other data). In an illustrative example, the output data 106 can include an output curve and/or calibration data (e.g., from calibration data 144 received from the calibration system 140) that maps different inputs and/or signals used to control the light source 120 to different properties of light emitted by the light source as further described below, such as different brightness levels, different intensity levels, different colors (or color levels), etc. The dimmer device 102 can store the output data 106 and any other data, such as parameters, logs, commands, performance information, device information, etc., on the memory 104 of the dimmer device 102.

In FIG. 1A, the dimming device 102 includes the memory 104, a communication circuit 108, and a dimming unit 110. The communication circuit 108 can include wired and/or wireless communication capabilities, such as a network interface card (NIC), a wireless NIC (WNIC), a short-range communications interface (e.g., Bluetooth, WIFI direct, Threads, near-field communications (NFC), etc.), and/or any other communication circuit. The dimming device 102 can use the communication circuit 108 to communicate with other devices, such as the switch device 116, the one or more sensors 130, the calibration system 140, and/or a separate device(s) (e.g., a mobile device, an IoT device, a smart wearable device, a computer, a television, an entertainment system, a gaming console, a camera system, a robotic device or gadget, a smart tool, a server, etc.).

The dimming unit 110 can include a controller(s) 112 and a dimming circuit 114. In some examples, the controller(s) 112 can include or represent a dimming driver, a processor(s) and/or processing system(s) (e.g., a central processing unit (CPU), a graphics processing unit (GPU), a digital signal processor (DSP), an image signal processor (ISP), an integrated circuit, a system-on-chip (SoC), a single board computer (SBC), a field-programmable gate array (FPGA), an application-specific integrated circuit (ASIC), a processor core(s), etc.), a microprocessor or microcontroller, a programmable logic controller (PLC), a microcomputer, etc. In some examples, the controller(s) 112 can include a driver, such as a constant voltage (CV) driver, a constant current reduction driver, a pulse-width modulation (PWM) driver, or any other dimming driver.

For illustration purposes, the dimming device 102 in the example shown in FIG. 1A includes one dimming unit 110. However, in other examples, the dimming device 102 may include multiple dimming units. In FIG. 1A, the controller(s) 112 is shown as being part of or implemented by the dimming unit 110. However, in other examples, the controller(s) 112 can be separate from the dimming unit 110, and the dimming unit 110 can optionally include another controller or driver. The dimming unit 110 may be configured to dim the light emitted by the light source 120 and/or change a color of the light emitted by the light source 120. In other examples, the dimming unit 110 may be configured to dim the light and/or change a color of the light emitted by multiple light sources.

The controller(s) 112 can generate control signals used to control the light source 120. The control signals can be or include forward phase signals, reverse phase signals, 3-wire control signals, 0-10 volts control signals, digital addressable lighting interface (DALI) control signals, digital multiplex (DMX) control signals, pulse-width modulation (PWM) control signals, or any other light source control signal. The controller(s) 112 can dim light emitted by the light source 120 and/or change a color of the light emitted by the light source 120 based on the control signals generated by the controller(s) 112. For example, the controller(s) 112 can be connected to the dimming circuit 114 of the dimming unit(s) 110, and can control the dimming circuit 114 to change the dimming level and/or color of the light emitted by the light source 120. In some cases, the controller(s) 112 can control a timing for turning on/off a semiconductor switch (a conduction angle with respect to the frequency of power) to adjust power supplied to the light source 120, thereby changing the properties of the light from the light source 120 (e.g., dimming the light, changing a color of the light, etc.).

The dimming circuit 114 can control power supplied to the light source 120. The amount of power supplied by the dimming circuit 114 to the light source 120 can be determined based on the control signal from the controller(s) 112. For example, in some cases, the controller(s) 112 can translate the control signal into a power signal provided by the dimming circuit 114 to the light source 120, which is used to control the light source 120. In some examples, the dimming circuit 114 can include a semiconductor switch, such as a field-effect transistor (FET) or a TRIAC, that allows alternating current to flow bi-directionally. The dimming device 102 can perform dimming and/or color-changing control over the light source 120 in a power-controlled manner or in a signal-controlled manner. The power-controlled manner can include a phase control scheme based on in-phase and a phase control scheme based on anti-phase. In some aspects, a semiconductor switch, such as a FET or a TRIAC, can be used as or included in the dimming circuit 114 to turn on at the timing of zero crossing of AC voltage from a power source.

In some examples, the controller(s) 112 can be configured to determine the control signal used to change a diming level and/or color of light emitted by the light source 120 by, for example, adjusting an on time and an off time for the light source 120 or adjusting power supplied to the light source 120. In some examples, the control signal can be determined based on the output data 106 and an input from the switch 118 and/or the switch device 116. As previously noted, the output data 106 can include calibration data 144 (or a portion thereof) from the calibration system 140. The calibration data 144 (or portion thereof) included in the output data 106 can be determined by the calibration system 140 based on sensor data collected from the one or more sensors 130, as further described herein.

In some aspects, the controller(s) 112 can be configured to adjust a driver of the controller(s) 112 based on a control signal to change the diming level and/or color of light emitted by the light source 120. In some examples, the control signal can indicate to the controller(s) 112 to adjust the power to the light source 120 by adjusting an on time and an off time duty cycle for the light source 120. In some cases, the controller(s) 112 can determine the control signal based on an output curve providing more linear and/or proportionate mapping of light output levels emitted by the light source 120 (e.g., brightness levels, intensity levels, colors or color levels, etc.) and dimming inputs (and corresponding control signals) used to control the light source 120 to emit light with such output levels. In some examples, the dimming inputs can include inputs to or from the switch 118, the switch device 116, and/or any other input element.

The calibration system 140 can be, include, represent, and/or be part of one or more devices such as, for example and without limitation, a computer (e.g., a laptop computer, a tablet computer, a desktop computer, a server computer, etc.), a mobile device (e.g., a mobile phone, a smart wearable device such as smartglasses or a smartwatch, a portable computing device, etc.), an IoT device, a television, an SoC, an SBC, a dimmer system component, a sensor system, a distributed system, a virtual machine (VM), a software container, an integrated circuit, a processing system, a virtual device, and/or any other software/virtual and/or hardware device. In some cases, the calibration system 140 can include a software or virtual calibration system configured to perform the functions and capabilities described herein. In some aspects, the calibration system 140 can be part of the dimmer device 102, the switch device 116, the light source 130, and/or the one or more sensors 130. In other cases, the calibration system 140 can additionally or alternatively be implemented by a separate device than the dimmer device 102, the switch device 116, the light source 130, and the one or more sensors 130, such as a separate IoT device, a separate computer, a separate integrated circuit, a separate computing tool, a separate controller system, etc.

Moreover, the calibration system 140 can include the memory 142, a controller(s) 150, and a communication circuit 152. The communication circuit 152 can include wired and/or wireless communication capabilities, such as a NIC, a WNIC, a short-range communications interface (e.g., Bluetooth, WIFI direct, Threads, NFC, etc.), and/or any other communication circuit. The calibration system 140 can use the communication circuit 152 to communicate with other devices, such as the dimmer device 102, the switch device 116, the one or more sensors 130, and/or a separate device(s) (e.g., a mobile device, an IoT device, a smart wearable device, a computer, a television, an entertainment system, a gaming console, a camera system, a robotic device or gadget, a smart tool, a server, etc.). The controller(s) 150 can include or represent a calibration driver, a processor(s) and/or processing system(s) (e.g., a CPU, a GPU, a DSP, an ISP, an integrated circuit, an SoC, an SBC, an FPGA, an ASIC, a processor core(s), etc.), a microprocessor or microcontroller, a PLC, a microcomputer, etc.

The calibration system 140 can be communicatively coupled to the dimmer device 102 and the one or more sensors 130 through wired or wireless connection (e.g., via communication circuit 152). The one or more sensors 130 can include any sensor capable of measuring, describing, and/or depicting/capturing light conditions in a scene of the lightning system 100. For example, the one or more sensors 130 can include, without limitation, an ambient light sensor, a color sensor, a photodiode or photodiode sensor, a phototransistor, an image/camera sensor, and/or any other type of light sensor. In some examples, the one or more sensors 130 can include a sensor implemented by or integrated with the dimmer device 102, the switch device 116, the switch 118, the light source 120, the calibration system 140, a separate device(s) in the scene of the lightning system 100 (e.g., a mobile device, a television, a camera system, an IoT device, a smart wearable device, an entertainment system, a security system, a computer, and/or any other device), and/or any other device(s) in the scene. In some cases, the one or more sensors 130 can additionally or alternatively be or include separate or standalone sensor systems such as a standalone camera system, a standalone light sensor, etc.

The one or more sensors 130 can capture or collect sensor data 146 measuring, depicting, and/or describing light conditions in the scene of the lightning system 100, such as output levels of light emitted by the light source 120, and provide such sensor data 146 to the calibration system 140. In some examples, the sensor data 146 from the one or more sensors 130 can additionally measure, depict, and/or describe other conditions in the scene of the lightning system 100 such as, for example and without limitation, environment conditions (e.g., light obstructions, shadows, weather conditions, humidity conditions, ambient light conditions, etc.), scene properties (e.g., objects in the scene, color of paint of structures (e.g., walls, doors, ceilings, etc.) in the scene, color of objects in the scene, configuration of the scene, type of scene, reflections in the scene, size of the scene, geometric shape of the scene, etc.), a position of the light source 120 within the scene (and/or relative to one or more things in the scene), position of the one or more sensors 130 within the scene and/or relative to the light source 120, and/or any other aspects of the scene.

The calibration system 140 can store the sensor data 146 on the memory 142, and use the sensor data 146 to determine the properties (e.g., output levels) of light emitted by the light source 120 (if any), such as the brightness levels of light emitted by the light source 120, the intensity levels of light emitted by the light source 120, a color (or color levels) of light emitted by the light source 120, etc. The calibration system 140 can use the information about the properties of the light emitted by the light source 120 to generate calibration data 144 used to calibrate dimming inputs and/or associated signals used to control the light source 120 based on the properties of light emitted by the light source 120. The calibration system 140 can provide the calibration data 144 to the dimmer device 102, which can store the calibration data 144 in the memory 104 (e.g., as part of the output data 106), and use the calibration data 144 to control the light source 120 as further described herein.

In some examples, the calibration data 144 can include an output curve that maps different light output levels generated by the light source 120 to dimming inputs and/or associated signals to or from the switch 118 and/or the switch device 116, which are used to trigger the light source 120 to emit the light with the different output levels corresponding to such dimming inputs and/or associated signals as mapped in the output curve. For example, the calibration system 140 can use information from the sensor data 146 about the output levels of light emitted by the light source 120 to generate an output curve that maps different light intensity levels, brightness levels, and/or colors generated by the light source 120 to the dimming inputs and/or associated signals to or from the switch 118, the switch device 116, and/or the controller(s) 112, which are used to trigger the light source 120 to emit light with such intensity levels, brightness levels, and/or colors.

For example, the calibration system 140 can obtain, from the one or more sensors 130, the sensor data 146 including information about the output levels (e.g., brightness levels, the intensity levels, and/or the color (or color levels)) of light emitted by the light source 120 as measured and/or determined by the one or more sensors 130. The calibration system 140 can also receive, from the dimmer device 102, information describing and/or identifying the dimming inputs and/or signals used to trigger the light source 120 to emit light with such output levels. The dimming inputs and/or signals described and/or identified in the information from the dimmer device 102 can include inputs to the switch 118 (e.g., positions/states of the switch 118), signals from the switch 118 (e.g., signals generated based on the inputs to the switch 118), the signals generated by the switch device 116 based on the signals from the switch 118, and/or the control signals generated by the controller(s) 112 based on the signals from the switch device 116.

The calibration system 140 can compare the output levels of the light emitted by the light source 120 and the dimming inputs and/or associated signals described and/or identified in the information from the dimmer device 102 to map different dimming inputs and/or associated signals used to control the light source 120 to different output levels of light emitted by the light source 120. In some examples, the calibration system 140 can compare such mapping to an output curve generated by the calibration system 140 (which can be included in the calibration data 144). The output curve can define a linear and/or proportional relationship between the dimming inputs and/or associated signals used to control the light source 120 and output levels of the light source 120. In some cases, the output curve can define what dimming inputs and/or associated signals should produce what output levels (e.g., intensity levels, brightness levels, colors, etc.) from the light source 120. For example, the output curve can map different dimming inputs for controlling the light source 120 to different output levels (e.g., brightness levels, intensity levels, color levels, etc.) according to a more linear or proportionate relationship between different dimming inputs and output levels.

By comparing the output curve to the mapping of different dimming inputs and/or associated signals and the corresponding light output levels identified in the sensor data 146, the calibration system 140 can determine one or more calibration parameters that the dimmer device 102 can use to calibrate the dimming inputs and/or associated signals used to control the light source 120 so that the dimming inputs and/or associated signals are more linearly or proportionally related to the output levels generated by the light source 120 in response to such calibrated dimming inputs and/or associated signals. This way, the differences in output levels set for the dimming inputs used to control the light source 120 are more proportional and/or linearly related to the differences in output levels (e.g., brightness levels, intensity levels, colors, etc.) produced by the light source 120 in response to such dimming inputs.

The calibration system 140 can include the calibration parameters in the calibration data 144, the output curve, and/or the mapping of dimming inputs and output levels, and provide such data to the dimmer device 102. The dimmer device 102 can store the calibration data 144 in the memory 104 as part of the output data 106. In some examples, the dimmer device 102 can apply the calibration information to dimming inputs and/or associated signals used to control the light source 120, to generate calibrated dimming inputs and/or associated signals used to trigger the light source 120 to emit light with output levels corresponding to the calibrated dimming inputs and/or associated signals (e.g., corresponding to the calibrated dimming inputs and/or associated signals along the output curve providing a more linear or proportional relationship between the calibrated dimming inputs and/or associated signals and the output levels of the light source 120).

For example, assume that a user, device, or application adjusts the switch 118 to control the light source 120 and, based on such input, the switch 118 generates a signal indicating that the input corresponds to a dimming level of 3 (e.g., from a range of dimming levels controllable via the switch 118). In addition, assume that without the calibration information, the input associated with the dimming level of 3 generally triggers the light source 120 to emit light with a dimming level of 5 (e.g., as measured by the one or more sensors 130) which does not match and is not linearly related to the dimming level that such input should produce as defined in the output curve, such as a dimming level of 3. In this example, the dimmer device 102 can calibrate the control signal generated based on such input such that the calibrated control signal from the dimmer device 102 triggers the light source 120 to emit light with a dimming level corresponding to the input as correlated in the output curve, such as a dimming level of 3. This way, when an input is provided (e.g., when the switch 118 is adjusted) with the intent to set the dimming level of light emitted by the light source 120 to a dimming level of 3, such input, upon calibration, actually triggers the light source 120 to emit light with a dimming level of 3 or a similar dimming level change that is more linearly related to the dimming level change associated with such input.

In some examples, the calibration data 144 in the output data 106 of the dimmer device 102 can identify light output levels from the light source 120 determined to result in or experience flicker. For example, the one or more sensors 130 can measure flicker that occurs when the output levels (e.g., the intensity levels, the brightness levels, etc.) of the light from the light source 120 are at and/or below a certain level. Here, the dimmer device 102 can use this information to prevent or reduce flicker from the light source 120. To illustrate, the dimmer device 102 can adjust the range of dimming levels of the light source 120 to exclude dimming levels that result or experience flicker or a threshold amount of flicker, as determined from the calibration data 144.

In some cases, the dimmer device 102 can set flicker thresholds such that dimming levels that result in less than a threshold amount of flicker may be allowed but dimming levels that result in more than the threshold amount of flicker are removed from the range of dimming levels (or prevented). In some aspects, whether to allow flicker and/or how much flicker to allow can be configured on a per user and/or per location basis. For example, the output data 106 can include user preferences indicating whether certain users wish to allow flicker or have defined a cutoff amount of flicker. Here, the dimmer device 102 can implement any flicker correction (or determine whether to implement any flicker correction and/or how much) based on the user in the scene, which the dimmer device 102 can determine based on the sensor data 130 (e.g., an image depicting the user), a user input, geolocation information from a device associated with the user (e.g., a mobile device, a Bluetooth tag, etc.), and/or any other information.

In some examples, the calibration system 140 can calibrate the minimum "ON" settings used for turning on the light source 120, the corresponding input thresholds used by the dimmer device 102 to trigger the minimum "ON" settings, the minimum dimming settings of the light source 120, and/or the corresponding input thresholds used by the dimmer device 102 to trigger the minimum dimming settings. For example, the calibration system 140 can determine the minimum "ON" settings, the input thresholds for the minimum "ON" settings, the minimum dimming settings, and the input thresholds for the minimum dimming settings, and include such information in the calibration data 144 used to calibrate the dimmer device 102. To this end, in some examples, the calibration data 144 can include data identifying the minimum "ON" settings for the light source 120, data identifying the minimum dimming settings for the light source 120, data for calibrating the minimum "ON" settings (e.g., calibration parameters, instructions, thresholds, etc.), and/or data for calibrating the minimum dimming settings (e.g., calibration parameters, instructions, thresholds, etc.). The dimmer device 102 can use such data in the calibration data 144 to calibrate the minimum "ON" settings and corresponding input parameters (e.g., input voltages/thresholds), and/or the minimum dimming settings and corresponding input parameters (e.g., input voltages/thresholds).

For example, there are various light systems and technologies that are unable to (or may often fail or struggle to) turn on (power on and emit light according to a light/dimming setting) from an off state in response to an input voltage if the input voltage is below a certain voltage. To illustrate, a light system that includes LED lights, which is one illustrative and non-limiting example of such light systems and technologies, may fail to turn on from an off state if the input voltage provided to the light system is below a threshold. Here, if the light system is turned off and the input voltage is below the threshold, the light system may not respond to the input voltage. Instead, if the light system is in an off state, the light system may only respond (e.g., turn on) to an input voltage if the input voltage exceeds the threshold. Nevertheless, once turned on, such light systems and technologies may be able to implement a dimming level that is triggered by an input voltage that is lower than the threshold. In other words, the light systems may respond to an input voltage that is lower than the threshold voltage if the light systems are already turned on when the input voltage is applied/received, but may not respond to such input voltage as expected (or at all) if the light systems are turned off when the input voltage is applied/received.

As such, the input voltage threshold for turning on the light systems can differ from the input voltage threshold for dimming the light systems when the light systems are already on. For example, the dimmer device 102 may be able to effectively use a threshold input voltage to set the light source 120 to a minimum dimming setting, but such threshold input voltage may not be effective for turning on the light source 120 as the light source 120 may need a higher input voltage to turn on as the light source 120, when turned off, may not respond to the threshold input voltage used to set it to the minimum dimming setting. Thus, the minimum or threshold input voltages needed to control the light source 120 may depend on whether the light source 120 is already turned on or not when receiving such input voltages.

However, the calibration system 140 (and/or the dimmer device 102) can calibrate the minimum "ON" setting for the light source 120 and the input voltage used by the dimmer device 102 to trigger the light source 120 to transition from an "OFF" state to the minimum "ON" setting (e.g., the input voltage used by the dimmer device 102 to turn on the light source 120 and set the light source 120 to the minimum "ON" setting) to ensure that the input voltage provided to the light source 120 when the light source 120 is in the "OFF" state is not below a threshold voltage determined to be sufficient/effective to set the light source 120 to the minimum "ON" setting (and/or to turn the light source 120 on at all) from the "OFF" state. In other words, the minimum "ON" setting of the light source 120 and corresponding input voltage can be calibrated to ensure that the input voltage used by the dimmer device 102 to turn on the light source 120 (e.g., to transition the light source 120 from the "OFF" state to the minimum "ON" setting) is above or equal to the threshold voltage determined to be sufficient/effective to turn on the light source 120 and/or transition the light source 120 from the "OFF" state to the minimum "ON" setting. Such calibration can prevent or minimize scenarios where the light source 120 does not respond to the input voltage provided by the dimmer device 102 if the light source 120 is in the "OFF" state when it receives the input voltage, and/or scenarios where the dimmer device 102 experiences failures and/or inaccuracies when turning on the light source 120 and/or setting the light source 120 to the minimum dimming setting.

In some aspects, the calibration system 140 can calculate a threshold voltage for turning on the light source 120 (e.g., for use when the light source 120 is in the "OFF" state) and a different threshold voltage for setting the light source 120 to the minimum dimming setting (e.g., for use when the light source 120 is already turned on). In some examples, the threshold voltage for turning on the light source 120 can include a minimum/lowest voltage needed to transition the light source 120 from the "OFF" state to the minimum "ON" setting. For example, the calibration system 140 can monitor how the light source 120 responds to (including failure to respond or non-responses) to different input voltages received by the light source 120 when the light source 120 is in the "OFF" state, in order to determine the minimum/lowest voltage from the different input voltage that the light source 120 responds to when the light source 120 is in the "OFF" state prior to receiving such voltage (e.g., the minimum/lowest input voltage that is effective to turn on the light source 120 from the "OFF" state such that any input voltage below such minimum/lowest input voltage does not trigger the light source 120 to turn on from the "OFF" state), and set the minimum/lowest input voltage (or a voltage above the minimum/lowest input voltage) as the threshold voltage for turning on the light source 120.

In some cases, the threshold voltage for setting the light source 120 to the minimum dimming setting when the light source 120 is already turned on can include a minimum/lowest voltage needed to set the light source 120 to the minimum dimming setting when the light source 120 is already turned on. For example, the calibration system 140 can monitor how the light source 120 responds to (including failure to respond or non-responses) to different input voltages received by the light source 120 when the light source 120 is in the "ON" state, in order to determine the minimum/lowest voltage from the different input voltage that effectively sets the light source 120 to the minimum dimming setting when the light source 120 is in the "ON" state prior to receiving such voltage, and set the minimum/lowest input voltage (or a voltage above the minimum/lowest input voltage) as the threshold voltage for setting the light source 120 to the minimum dimming setting when the light source 120 is already turned on.

The calibration system 140 can include, in the calibration data 144 used to calibrate the dimmer device 102, any of the data about (and/or used for implementing) the minimum "ON" setting, the threshold voltage for the minimum "ON" setting, the minimum dimming setting, and/or the threshold voltage for the minimum dimming setting. For example, the calibration data 144 can include an indication of the minimum "ON" setting of the light source 120, an indication of the threshold voltage for the minimum "ON" setting (e.g., an input setting defining the threshold voltage as the minimum/lowest input voltage to use to control the light source 120 when the light source 120 is in the "OFF" state), an indication of the minimum dimming setting, an indication of the threshold voltage used to set the minimum dimming setting when the light source 120 is already on, the threshold voltage for transitioning the light source 120 from the "OFF" state to the minimum dimming setting (e.g., if different from the threshold voltage used to set the minimum dimming setting when the light source 120 is already on), an instruction or restriction preventing the dimmer device 102 from using input voltages that are lower than the threshold voltage defined for controlling the light source 120 when the light source 120 is in the "OFF" state, data mapping the minimum "ON" setting to an input voltage that is based on a threshold voltage defined for when the light source 120 is in the "OFF" state (e.g., an input voltage that is greater than or equal to such threshold voltage), data mapping the minimum dimming setting to an input voltage that is based on a threshold voltage determined for scenarios when the light source 120 is already on (e.g., an input voltage that is greater than or equal to such threshold voltage), data mapping the minimum dimming setting to an input voltage that is based on a threshold voltage determined for scenarios when the light source 120 is in the "OFF" state (e.g., an input voltage that is greater than or equal to such threshold voltage), and/or one or more calibration parameters used to translate inputs (e.g., control signals, inputs to/from the switch 118 and/or the switch device 116, etc.) for implementing the minimum "ON" setting and/or the minimum dimming setting to respective voltages (input voltages) that can be used to trigger such responses/settings.

The input voltage(s) associated with a calibration parameter(s) used to translate an input can be based on a threshold voltage calculated for a particular light source state and response, such as an "ON" state or an "OFF" state, a minimum "ON" setting, a minimum dimming setting, etc. For example, the input voltage(s) for turning on the light source 120 can be the same as or higher than a threshold voltage for turning on the light source 120, the input voltage(s) for setting the light source 120 to the minimum dimming setting when the light source 120 is already turned on can be the same as or higher than a corresponding threshold voltage, and the input voltage(s) for setting the light source 120 to the minimum dimming setting when the light source 120 is not already turned on can be the same as or higher than a corresponding threshold voltage. In some cases, the calibration data 144 can include any other data used by the dimmer device 102 to control the light source 120 and/or identify input voltages that the light source 120 responds to, including input voltages that the light source 120 responds to when the light source 120 is in the "OFF" state.

In some examples, the calibration data 144 can be used to configure the dimmer device 102 to use certain input voltages for certain actions, such as a first input voltage for turning on the light source 120 (e.g., for setting the light source 120 to a minimum "ON" setting), a second input voltage for setting the light source 120 to the minimum dimming level from an "ON" state, and/or a third input voltage for setting the light source 120 to the minimum dimming level from an "OFF" state. The first, second, and third input voltages can differ or can be the same. Moreover, the first, second, and third input voltages can be the same as or greater than specific threshold voltages determined for respective light source states and responses. For example, the first input voltage for turning on the light source 120 can be the same as or greater than a threshold voltage (e.g., a minimum/lowest voltage) calculated for transitioning the light source 120 from the "OFF" state to the minimum "ON" state (e.g., to turn the light source 120 on to the minimum "ON" setting). In this example, the data specifying the first input voltage and/or the parameters for calibrating the first input voltage can prevent the dimmer device 102 from using input voltages that are lower than the threshold voltage to control the light source 120 when the light source 120 is in the "OFF" state (e.g., to prevent the dimmer device 102 from using input voltages lower than the threshold voltage to turn on the light source 120).

In some cases, when determining the threshold voltage for a particular light source state and intended action, the calibration system 140 can determine whether there are any inconsistencies in the responses of the light source 120 to input voltages. For example, the calibration system 140 can determine whether the response of the light source 120 to input voltages received when the light source 120 is in the "OFF" state varies such that the light source 120 is inconsistent in its response to a particular input voltage. To illustrate, the calibration system 140 may determine that, when the light source 120 receives the particular input voltage while the light source 120 is in the "OFF" state, the light source 120 responds to the particular input voltage as expected some of the times but not all of the times. The calibration system 140 may determine that, when the light source 120 receives the particular input voltage while the light source 120 is in the "OFF" state, the light source 120 responds to the particular input voltage as expected only a certain percentage or amount of the times.

In such examples, the calibration system 140 may not want to use that particular input voltage as the threshold voltage for transitioning the light source 120 from the "OFF" state to an "ON" state (e.g., the minimum "ON" setting) as such threshold voltage may produce inconsistent results or results that have less than a desired consistency. Instead, the calibration system 140 can set the threshold voltage to the minimum/lowest voltage that has at least a threshold probability of successfully triggering the light source 120 to transition from the "OFF" state to an "ON" state (e.g., the minimum "ON" setting), the minimum/lowest voltage that triggers the light source 120 to transition from the "OFF" state to the "ON" state every time it receives such voltage while in the "OFF" state, the minimum/lowest voltage that triggers the light source 120 to transition from the "OFF" state to the "ON" state at least a threshold number or percentage of times it receives such voltage while in the "OFF" state, or the minimum/lowest voltage determined to trigger the desired response from the light source 120 (when the light source 120 is in the "OFF" state) with a desired accuracy, frequency, and/or likelihood. This way, the calibration system 140 can calibrate the minimum "ON" setting and the corresponding input voltage used when the light source 120 is powered off according to the desired input response accuracy, frequency, probability, and/or preferences and/or to avoid or reduce inconsistencies in the response of the light source 120 to input voltages received while in the "OFF" state.

As another example, the calibration system 140 may determine that when the light source 120 receives, while the light source 120 is in the "ON" state, a specific input voltage for implementing the minimum dimming setting, the light source 120 responds to the specific input voltage as expected some of the times it receives the specific input voltage but not all of the times. In such examples, the calibration system 140 may not want to use that specific input voltage as the threshold voltage for setting the light source 120 from an "ON" state (other than the minimum dimming setting) to the minimum dimming setting, as such threshold voltage may produce inconsistent results or results that have less than a desired consistency. Instead, the calibration system 140 can set the threshold voltage to the minimum/lowest voltage that has at least a threshold probability of successfully triggering the light source 120 to transition to the minimum dimming setting, the minimum/lowest voltage that triggers the light source 120 to transition to the minimum dimming setting every time it receives such voltage while in the "ON" state, the minimum/lowest voltage that triggers the light source 120 to transition to the minimum dimming setting at least a threshold number or percentage of times it receives such voltage while in the "ON" state, or the minimum/lowest voltage determined to trigger the desired response from the light source 120 (when the light source 120 is in the "ON" state) with a desired accuracy, frequency, and/or likelihood. This way, the calibration system 140 can calibrate the minimum dimming setting and the corresponding input voltage used when the light source 120 is powered on according to the desired input response accuracy, frequency, probability, and/or preferences and/or to avoid or reduce inconsistencies in the response of the light source 120 to input voltages for setting the minimum dimming setting received by the light source 120 while in the "ON" state.

As illustrated above, the calibration data 144 can include data that can be used to automatically calibrate different light settings and input voltages so that to transition the light source 120 from the "OFF" state to the "ON" state (e.g., to the minimum "ON" setting), the dimmer device 102 can use a minimum or threshold voltage for turning on the light source 120 as a defined limit/threshold and, to set the light source 120 to a dimming setting such as the minimum dimming setting, the dimmer device 102 can use a different minimum or threshold voltage for such dimming operation. In this example, the input voltage for transitioning the light source 120 from the "OFF" state to the "ON" state is described as being different than the input voltage for the dimming operation (e.g., setting the light source 120 to the minimum "ON" setting). However, it should be noted that, in other cases, the input voltage for transitioning the light source 120 from the "OFF" state to the "ON" state can be the same as the input voltage for the dimming operation. In some cases, the input voltage used for the dimming operation can be the same when the light source 120 is in the "ON" state or the "OFF" state prior to the dimming operation but, in other cases, the input voltage used for the dimming operation can differ depending on whether the light source 120 is in the "ON" state or the "OFF" state prior to the dimming operation (e.g., the input voltage used for the dimming operation when the light source 120 is already in the "ON" state can differ from the input voltage used for the dimming operation when the light source 120 is in the "OFF" state.

Moreover, in some cases, the calibration system 140 can generate a same output curve and/or calibration parameters for different light sources, including light sources of the same or different types, brands, configurations, etc. This way, the relationship between light output properties/levels and associated signals is the same across multiple light sources and/or dimming devices. In other cases, the calibration system 140 can generate different output curves and/or calibration parameters for different light sources. For example, the calibration system 140 can generate different output curves and/or calibration parameters for different light sources based on the types of light sources, the brands of light sources, the locations of light sources, usage schedules associated with the light sources, users controlling the light sources at any given time, the dimmer devices used to control the light sources, and/or any other factors. This way, the relationship between light output properties/levels and associated signals may be different/customized across light sources and/or dimming devices.

Having described examples of a lightning system 100 used to calibrate and control light sources and light outputs from light sources, the disclosure now turns to a description of systems and techniques for calibrating and controlling light sources and light outputs in a lightning system such as the example lightning system 100.

Calibrating and Controlling Outputs From Light Sources

Figure 2A:
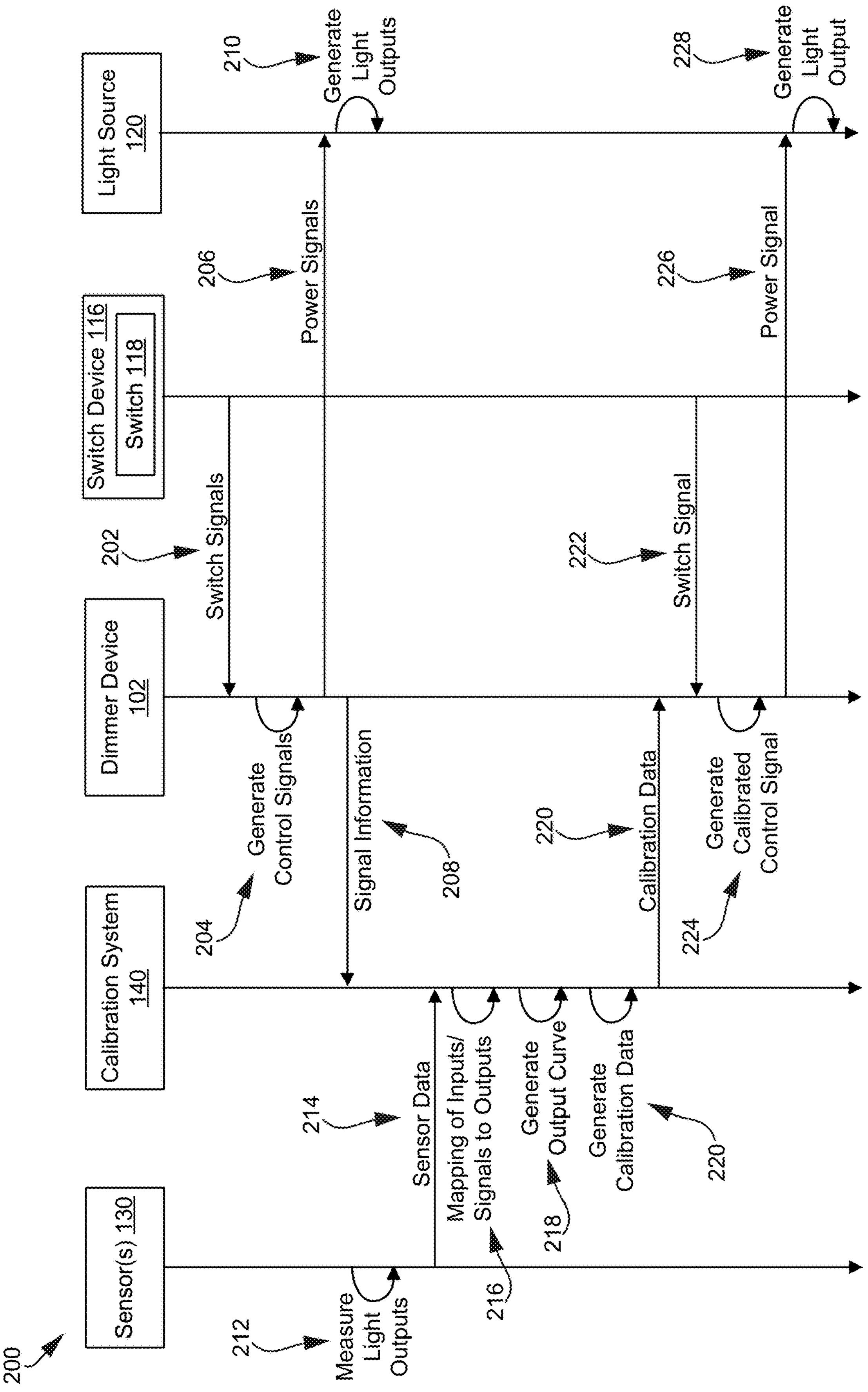
FIG. 2A is a diagram illustrating an example process for implementing a lightning system, according to some examples of the present disclosure.

FIG. 2A is a diagram illustrating an example process 200 for implementing a lightning system, according to some examples of the present disclosure. The process 200 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the process 200. Further, some of the steps may be performed simultaneously, or in a different order than shown in FIG. 2A, as will be understood by a person of ordinary skill in the art. The process 200 shall be described with reference to FIG. 1A. However, the process 200 is not limited to that example.

As shown, the switch device 116 generates switch signals 202 based on dimming inputs. The switch device 166 then sends the switch signals 202 to the dimmer device 102. The switch device 116 can generate the switch signals 202 based on signals from the switch 118, which can be generated based on dimming inputs, such as adjustments of a component of the switch 118 (e.g., a lever, a knob, a button, a toggle, etc.). The switch signals 202 can represent dimming inputs intended to control the light source 120, such as dimming inputs to adjust dimming levels of the light source 120, colors of the light emitted by the light source 120, etc.

The dimmer device 102 can receive the switch signals 202 and generate control signals 204 based on the switch signals 202. The control signals 204 can represent signals for controlling the light source 120 consistent with the switch signals 202. The dimmer device 102 can translate the control signals 204 to power signals 206 configured to control outputs of the light source 120 by supplying power and/or adjusting power to the light source 120 in a manner that controls the outputs of the light source 120 as provided by the switch signals 202 and the control signals 204. The dimmer device 102 can provide the power signals 206 to the light source 120, which can use the power signals 206 to generate light outputs 210 having certain output levels, such as brightness levels, intensity levels, and/or colors. The dimmer device 102 can send signal information 208 to the calibration system 140, which the calibration system 140 can use with sensor data to generate an output curve and/or calibration data, as further described herein. In some examples, the signal information 208 can include a description, indication, and/or information about the dimming inputs associated with the switch signals 202, the switch signals 202, the control signals 204, and/or the power signals 206 used to trigger the light source 120 to generate the light outputs 210.

The one or more sensors 130 can sense 212 information about the light outputs 210, such as brightness levels, intensity levels, and/or colors. The one or more sensors 130 can generate sensor data 214 based on the sensed information, which can include information about the light outputs 210 such as brightness levels, intensity levels, and/or colors of the light outputs 210.

The calibration system 140 can obtain the sensor data 214 from the one or more sensors 130, and use the sensor data 214 and the signal information 208 to generate a mapping 216 of dimming inputs to light output levels. The mapping 216 can specify what dimming inputs (e.g., and associated signals such as switch signals 202, control signals 204, and/or power signals 206) resulted in what output levels of the light outputs 210, such as brightness levels, intensity levels, and/or colors. In some examples, the calibration system 140 can generate an output curve 218 that provides a more linear and/or proportional mapping of dimming inputs (and/or associated signals) to light output levels based on the sensor data 214 and the signal information 208. For example, the output curve 218 can define a linear (or substantially linear) curve plotting dimming inputs and/or associated signals to output levels from the light source 120.

In some cases, the calibration system 140 can compare the output curve 218 with the mapping 216 to determine calibration data 220 that the dimmer device 102 can use to calibrate dimming inputs and/or associated signals used to trigger the light source 120 to emit light having output levels corresponding to such calibrated dimming inputs and/or associated signals. In some examples, the calibrated dimming inputs and/or associated signals generated using the calibration data 220 can include inputs to the switch 118 associated with the switch device 116, switch signals, control signals, and/or power signals obtained by the dimmer device 102 and calibrated using the calibration data 220. For example, in some cases, the calibrated signals can include calibrated dimming inputs used to generate control signals that the dimmer device 102 can translate into power signals configured to trigger the light source 120 to emit light having corresponding output levels mapped to such calibrated dimming inputs by the output curve 218. As another example, the calibrated dimming inputs and/or associated signals can include calibrated signals generated from dimming inputs received by or from the switch 118 and/or the switch device 116, and which the dimmer device 102 can translate into power signals configured to trigger the light source 120 to emit light having corresponding output levels mapped to such calibrated signals by the output curve 218.

In some examples, the calibration data 220 can include one or more calibration parameters that the dimmer device 102 can apply to signals associated with dimming inputs used to trigger outputs from the light source 120 such that the signals are calibrated to yield respective power signals (e.g., when translated by the dimmer device 102 to such power signals) determined to trigger the light source 120 to emit light having output levels mapped to the dimming inputs associated with the calibrated signals in the output curve 218 (and/or the calibration data 220). In some cases, the calibration data 220 can optionally include a copy of the output curve 218 generated by the calibration system 140 (and any other information).

After generating the calibration data 220, the calibration system 140 can provide the calibration data 220 to the dimmer device 102, which can store the calibration data 220 for use in calibrating inputs and/or signals so that the calibrated inputs and/or signals are more linearly or proportionally related to the output levels generated by the light source 120 based on such calibrated inputs and/or signals.

In response to an input at the switch 118, the switch device 116 can send a switch signal 222 to the dimmer device 102, which the dimmer device 102 can use to control the light source 120. The dimmer device 102 can generate a calibrated control signal 224 based on the switch signal 222 received. In some examples, the dimmer device 102 can use one or more calibration parameters in the calibration data 220 to calibrate the switch signal 222, and can use the calibrated switch signal to generate the calibrated control signal 224. In other examples, the dimmer device 102 can generate a control signal based on the switch signal 222, and use one or more calibration parameters in the calibration data 220 to calibrate the control signal generated to yield the calibrated control signal 224. The calibrated control signal 224 can be configured to trigger the light source 120 to emit light with output levels (e.g., brightness, intensity, color, etc.) corresponding to the input associated with the calibrated control signal 224, as correlated in the output curve 218.

The dimmer device 102 can translate the calibrated control signal 224 into a power signal 226 configured to trigger the light source 120 to generate a light output 228 having the output levels corresponding to the input and associated calibrated control signal 224 in the output curve 218, such as brightness, intensity, and/or color properties corresponding to the input and calibrated control signal 224 as correlated in the output curve 218.

The light source 120 can receive the power signal 226 and generate the light output 228 with the output levels associated with the input and the calibrated control signal 224 in the output curve 218. The dimmer device 102 can similarly use the calibration data 220 to calibrate any other input or signal for the light source 120.

Since the calibration system 140 may need multiple datapoints to generate the output curve 218, the light outputs 210 sensed by the one or more sensors 130 can represent multiple light outputs, and the switch signals 202, control signals 204, and power signals 206 used to generate the light outputs can each represent multiple signals generated based on dimming inputs. However, the switch signal 222, the calibrated control signal 224, and the power signal 226 generated after obtaining the calibration data 220 from the calibration system 140 can each represent a respective set of signals generated in response to an input to the switch 118, and the light output 228 can represent a light output generated in response to the input and the respective set of signals. Thus, each time there is an input to the switch 118, the process 200 can generate a corresponding switch signal, control signal, power signal, and light output correlated to the input in the output curve 218.

Figure 2B:
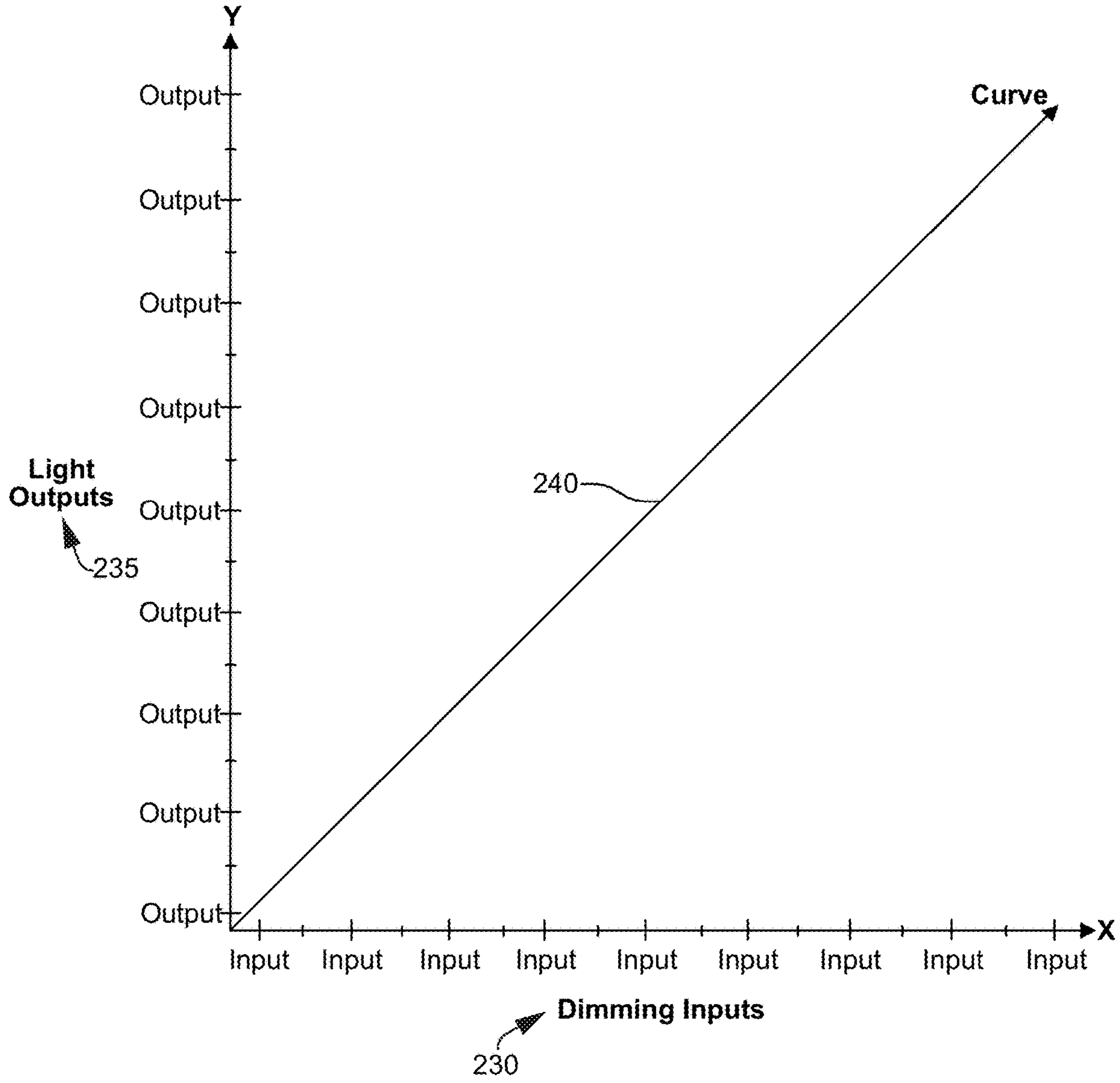
FIG. 2B is a graph illustrating an example curve plotting a relationship between dimming inputs and light outputs, according to some examples of the present disclosure.

FIG. 2B is a graph illustrating an example curve plotting a relationship between dimming inputs 230 used to control the light source 120 of the lighting system 100 and light outputs 235 generated by the light source 120 of the lighting system 100. The x-axis of the graph represents the dimming inputs 230 and the y-axis of the graph represents the light outputs 235. The graph shows a curve 240 plotting a relationship between the light outputs 235 and the dimming inputs 230.

Figure 2C:
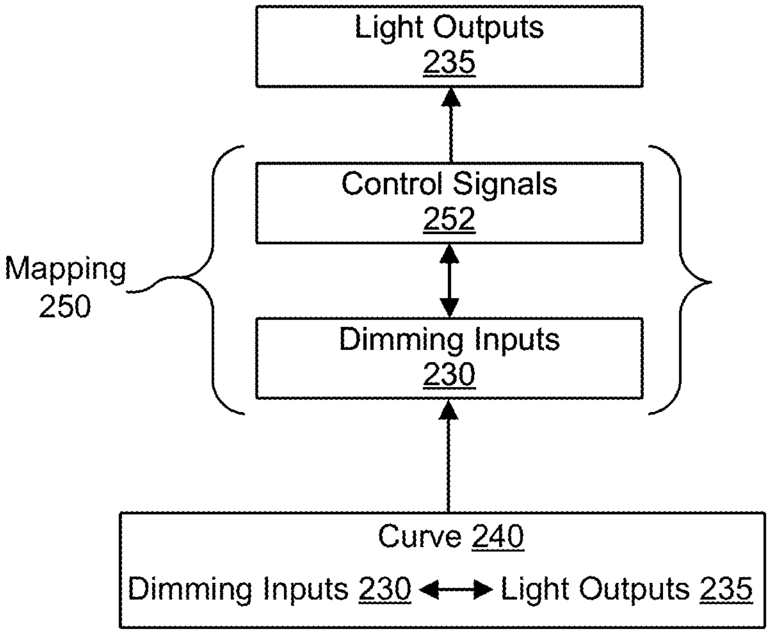
FIG. 2C is a diagram illustrating an example mapping of dimming inputs to respective control signals, according to some examples of the present disclosure.

FIG. 2C is a diagram illustrating an example mapping 250 of dimming inputs 230 to respective control signals 252. The mapping 250 can be based on the curve 240 plotting the relationship between the light outputs 235 and the dimming inputs 230. The respective control signals 254 represent control signals configured to trigger the light source 120 to generate the light outputs 235. Thus, the mapping 250 can map the dimming inputs 230 used to control the light source 120 to respective control signals 252 configured to trigger the light source 120 to generate the light outputs 235.

Figure 3:
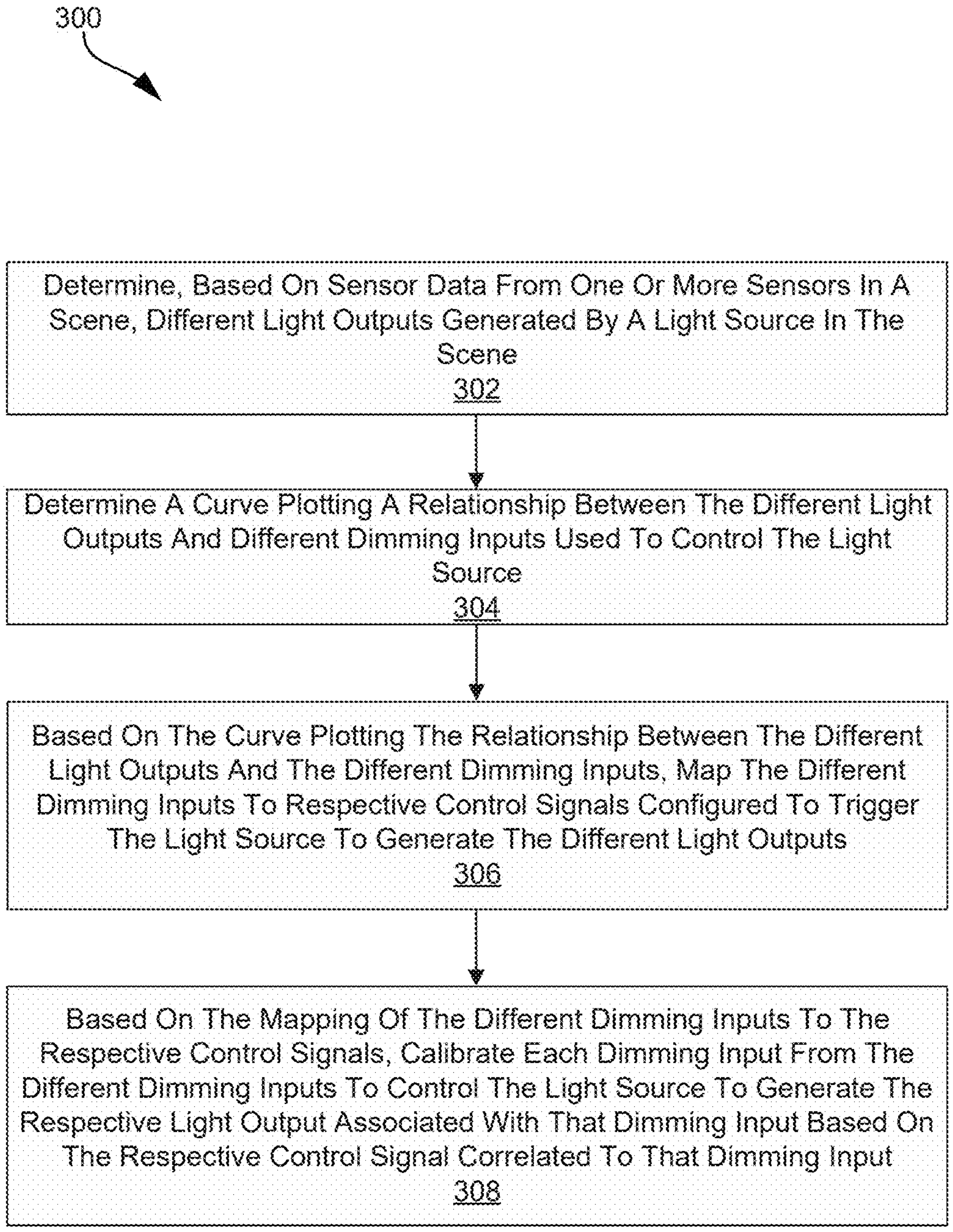
FIGS. 3 and 4 are flowcharts illustrating example methods for calibrating and controlling light sources and associated outputs in a lightning system, according to some examples of the present disclosure.

FIG. 3 is a flowchart illustrating an example method 300 for calibrating and controlling light sources and associated outputs in a lightning system (e.g., lightning system 100), according to some examples of the present disclosure. The method 300 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the method 300. Further, some of the steps may be performed simultaneously, or in a different order than shown in FIG. 3, as will be understood by a person of ordinary skill in the art. The method 300 shall be described with reference to FIGS. 1A-1B. However, the method 300 is not limited to those examples.

At step 302, the calibration system 140 can determine, based on sensor data 146 from one or more sensors 130 in a scene, different light outputs generated by the light source 120 in the scene. The different light outputs can include different light properties. For example, the different light outputs can include different brightness levels, different intensity levels, and/or different color levels.

In some examples, the one or more sensors 130 can include a color sensor, an image sensor (e.g., a camera sensor), a light sensor, a photodiode, a photodiode sensor, a phototransistor, and/or any other image and/or light sensor. Moreover, in some examples, the light source 120 can include an LED light, an incandescent light, a halogen light, a metal halide light, and/or a fluorescent light. In some cases, the light source 120 can include a single light. In other cases, the light source 120 can include multiple lights, such as a light strip with multiple lights, multiple LEDs, multiple light bulbs, multiple lamps, etc.

In some examples, the sensor data 146 can indicate the properties of the different light outputs, such as the brightness levels, intensity levels, and/or color levels (e.g., colors) of the different light outputs. For example, the one or more sensors 130 can sense and/or measure the different light outputs, including the respective properties of the light in the light outputs. The calibration system 140 can receive the sensor data 146 from the one or more sensors 130 and, based on the sensor data 146, determine the properties of the different light outputs, such as the brightness levels, intensity levels, and/or color levels (e.g., colors) of the different light outputs. The calibration system 140 can use the sensor data 146 to determine the properties of the different light outputs of the light source 120 to understand the different output levels generated by the light source 120 and map the different output levels generated by the light source 120 to control inputs, such as control inputs provided via the switch 118 and/or the switch device 116 to control an output of the light source 120. This way, the calibration system 140 can calibrate the dimmer device 102 used to control the light source 120 to control the light source 120 to generate outputs with light properties (e.g., output levels) corresponding to the output levels associated with the control inputs provided via the switch 118 and/or the switch device 116 to trigger the dimmer device 102 to control the light source 102 to generate an output with such light properties.

At step 304, the calibration system 140 can determine a curve plotting a relationship between the different light outputs and different dimming inputs used to control the light source 120. In some examples, the different dimming inputs can include inputs to the switch 118 and/or the switch device 116, and/or signals generated by the switch 118 and/or the switch device 116 based on the different dimming inputs. For example, the different dimming inputs can include different inputs provided via the switch 118, which is communicatively coupled to the dimmer device 102, or switch inputs to the dimmer device 102 generated based on inputs to the switch 118. In some examples, the different dimming inputs can include inputs from the switch 118 or the switch device 116 to the dimmer device 102 used to control the light source 120.

In other examples, the different dimming inputs can include input signals generated by the dimmer device 102 from switch signals provided to the dimmer device 102 by the switch 118 or the switch device 116 based on inputs to the switch 118 or the switch device 116. The input signals generated by the dimmer device 102 from the switch signals can include, for example, control signals used by the dimmer device 102 (e.g., by the controller(s) 112 of the dimmer device 102) to generate power signals used by the dimmer device 102 to control the light source 120. In some cases, the different dimming inputs can represent the possible inputs and/or input settings available at a device used to control the light source 120, such as the switch 118, the switch device 116, or the dimmer device 102.

In some examples, the curve plotting the relationship between the different light outputs and different dimming inputs can be or include a linear curve. For example, the different dimming inputs can be linearly related to the different light outputs. In some cases, the relationship between the different light outputs and the different dimming inputs plotted by the curve can create a corresponding relationship between power signals used to generate the different light outputs (e.g., power signals used by dimmer device 102 to control the light source 120) and the respective control signals, which can be used to generate the power signals. For example, the relationship between the different light outputs and the different dimming inputs plotted by the curve can be a linear or proportional relationship.

In some examples, the relationship between the different light outputs and the different dimming inputs plotted by the curve can be more linear and/or proportional than a different relationship that exists, prior to calibration as described below (and above with respect to FIGS. 1A, 1B, and 2), between the different dimming inputs and the actual light outputs generated by the light source 120 in response to the different dimming inputs.

For example, assume that the switch 118 includes dimming input settings (e.g., provided to or set via the switch 118 by, for example, adjusting a lever of the switch 118, adjusting a knob of the switch 118, adjusting a input element on the switch 118, pressing or interacting with a button on the switch 118, providing an input via an application associated with the switch 118, verbally speaking a command identifying a desired input to or action by the switch 118, etc.) associated with different output levels (e.g., brightness levels, intensity levels, color levels, etc.) of the light source 120, such as output level of 1 through output level of 10 (e.g., with output level 1 being the lowest output level and output level 10 being the highest output level). In this example, the calibration system 140 can create a curve plotting a relationship between the output levels 1 through 10 associated with the dimming input settings of the switch 118 and properties (e.g., output levels) of the different light outputs. The curve can correlate different output levels associated with the dimming input settings of the switch 118 with output levels generated by the light source 120 in a manner that correlates increases in the output levels associated with the dimming input settings of the switch 118 with proportional or linear increases in the output levels of the different light outputs from the light source 120. Similarly, the curve can correlate decreases in the output levels associated with the dimming input settings of the switch 118 with proportional or linear decreases in the output levels of the different light outputs from the light source 120.

This way, the curve can provide a proportional or linear correlation of output levels associated with the dimming input settings of the switch 118 with output levels of the different light outputs of the light source 120 such that changes (e.g., increases and decreases) in the output levels associated with the dimming input settings of the switch 118 are correlated with proportional or linear changes (e.g., increases, decreases) in the output levels of the different light outputs from the light source 120. In other words, the curve can provide a proportional or linear relationship between dimming inputs (e.g., dimming inputs, color-changing inputs, etc.) associated with the switch 118 and responses (e.g., light outputs and corresponding properties) to such dimming inputs generated by the light source 120. To illustrate, in the previous example, the output level of 1 associated with a dimming input setting of the switch 118 can be correlated in the curve to an output level of 1 (e.g., a brightness level of 1, an intensity level of 1, a color associated with the output level of 1, etc.) from the different light outputs of the light source, the output level of 5 associated with another dimming input settings of the switch 118 can be correlated in the curve to an output level of 5 (e.g., a brightness level of 5, an intensity level of 5, a color associated with the output level of 5, etc.) from the different light outputs of the light source 120, and so forth.

Thus, the curve can be used to calibrate a control by the dimmer device 102 of the light source 120 as further described herein, such that when a user provides a dimming input to the switch 118 (and/or the switch device 116) in order to set a particular output level for the light source 120, the dimming input can be converted or translated to a signal to the light source 120 that triggers the light source 120 to emit light with the particular output level associated with that dimming input. Therefore, the user can know that the light settings set for the light source 120 via dimming inputs to the switch 118 (and/or the switch device 116) will be proportionally or linearly related to the response (e.g., the light settings) to such dimming inputs generated by the light source 120. Accordingly, the user can avoid common issues with other lightning systems where some dimming inputs to control an output of a light source result in disproportionately larger differences in the output levels generated by the light source than other dimming inputs.

In other words, the user can avoid imprecisions in the responses to dimming inputs used to control a light source that are common in other lightning systems, such that, for example, an output level of 5 associated with a dimming input used to control a light source may result in a light output from the light source having an output level of approximately 5 and an output level of 4 associated with another dimming input used to control the light source may result in a light output from the light source having an output level of approximately 4, while an output level of 3, for example, associated with a dimming input used to control the light source may disadvantageously result in a light output from the light source having an output level of 1 or 0 as opposed to 3, such that the dimming input intended to set the output level of the light source to 3 causes a disproportionate change in the output level of the response from the light source relative to the output level of the response from the light source resulting from other inputs used to set other output levels, such as the dimming inputs associated with the output levels of 4 and 5 in the previous example.

At step 306, based on the curve plotting the relationship between the different light outputs and the different dimming inputs, the calibration system 140 can map the different dimming inputs to respective control signals configured to trigger the light source 120 to generate the different light outputs. Here, the mapping of the different dimming inputs to respective control signals associated with the different light outputs correlates each dimming input from the different dimming inputs to a respective light output from the different light outputs and to a respective control signal (from the respective control signals) configured to trigger the light source 120 to generate the respective light output. Thus, the mapping can correlate each dimming input to a particular light output (e.g., a particular brightness level, a particular intensity level, a particular color or color level, etc.) and a particular control signal that can be used to trigger the light source 120 to generate the particular light output associated with that dimming input.

In some cases, the mapping of the different dimming inputs to the respective control signals can also map the respective control signals to power signals used to control the light source 120 to generate the different light outputs. In some examples, the mapping of the different dimming inputs to the respective control signals can identify power signals to generate based on the respective control signals in order to control the light source 120 to generate the different light outputs using the power signals.

At step 308, based on the mapping of the different dimming inputs to the respective control signals, the calibration system 140 can calibrate each dimming input from the different dimming inputs to control the light source 120 to generate the respective light output associated with that dimming input based on the respective control signal correlated to that dimming input. In some examples, the calibration can specify which of the respective control signals to use to control the light source 120 to generate a particular light output in response to a corresponding dimming input from the different dimming inputs.

In some aspects, calibrating each dimming input can include providing, by the calibration system 140 to the dimmer device 102, calibration data 144 which in some examples can specify each respective control signal to use to control the light source 120 in response to each dimming input from the different dimming inputs. For example, calibrating each dimming input can include generating calibration data 144 correlating each dimming input from the different dimming inputs to a respective light output from the different light outputs and to a respective control signal configured to trigger the light source 120 to generate the respective light output. In some cases, the calibration data 144 can include the curve plotting the relationship between the different light outputs and the different dimming inputs and/or the mapping of the different dimming inputs to respective control signals associated with the different light outputs. In some cases, the calibration data 144 can include calibration parameters identifying the respective control signals to implement in response to the different dimming inputs, specifying correlations between the different light outputs and the different dimming inputs, and/or specifying how to modify the control signals used to generate the different light outputs to produce the respective control signals associated with the different dimming inputs.

As previously described, the calibration of each dimming input can calibrate a control by the dimmer device 102 of the light source 120, such that when a user (and/or a device or software) provides a dimming input to the switch 118 (and/or the switch device 116) in order to set a particular output level for the light source 120, the dimming input can be used to control the light source 120 (e.g., used to indirectly control the light source 120 via a power signal generated from a control signal associated with the dimming input) to emit light with the particular output level associated with that dimming input. In other words, the different dimming inputs can be used to control the light source 120 to generate light outputs having output levels that are more linearly and/or proportionally related to the output levels associated with the different dimming inputs (and set via the different dimming inputs). Therefore, the user can know that, after the calibration in method 300, the light settings defined for the light source 120 via the different dimming inputs (e.g., via dimming inputs to or from the switch 118 and/or the switch device 116) will be more proportionally and/or linearly related to the response (e.g., the light settings) to the different dimming inputs generated by the light source 120, than such dimming inputs are prior to the calibration in method 300. Accordingly, the user can avoid common issues with other lightning systems where some dimming inputs to control an output of the light source result in disproportionately larger differences in the output levels generated by the light source than other dimming inputs.

In other words, the user can avoid imprecisions in the responses to dimming inputs used to control the light source that are common in other lightning systems, such that, for example, an output level of 5 associated with a dimming input used to control the light source may result in a light output from the light source having an output level of approximately 5 and an output level of 4 associated with another dimming input used to control the light source may result in a light output from the light source having an output level of approximately 4, while an output level of 3, for example, associated with a dimming input used to control the light source may undesirably result in a light output from the light source having an output level of 1 or 0 as opposed to 3, such that the dimming input intended to set the output level of the light source to 3 causes a disproportionate change in the output level of the response from the light source relative to the output level of the response from the light source resulting from other inputs used to set other output levels, such as the dimming inputs associated with the output levels of 4 and 5 in the previous example.

In some aspects, the dimmer device 112 used to control the light source 120 can receive a dimming input from the different dimming inputs. In response to receiving the dimming input from the different dimming inputs, the dimmer device 112 can determine the respective control signal correlated to the dimming input and, based on the respective control signal, generate a power signal configured to trigger the light source 120 to generate the respective light output associated with the dimming input. In some examples, the dimmer device 112 can determine the respective control signal based on the calibration performed at step 308 (and/or associated calibration data, such as calibration data 144). The respective light output can include, for example, a specific brightness level associated with the dimming input, a specific intensity level associated with the dimming input, and/or a specific color (and/or color levels) associated with the dimming input. The dimmer device 112 can send the power signal to the light source 120, which can trigger the light source 120 to generate the respective light output.

Figure 4:
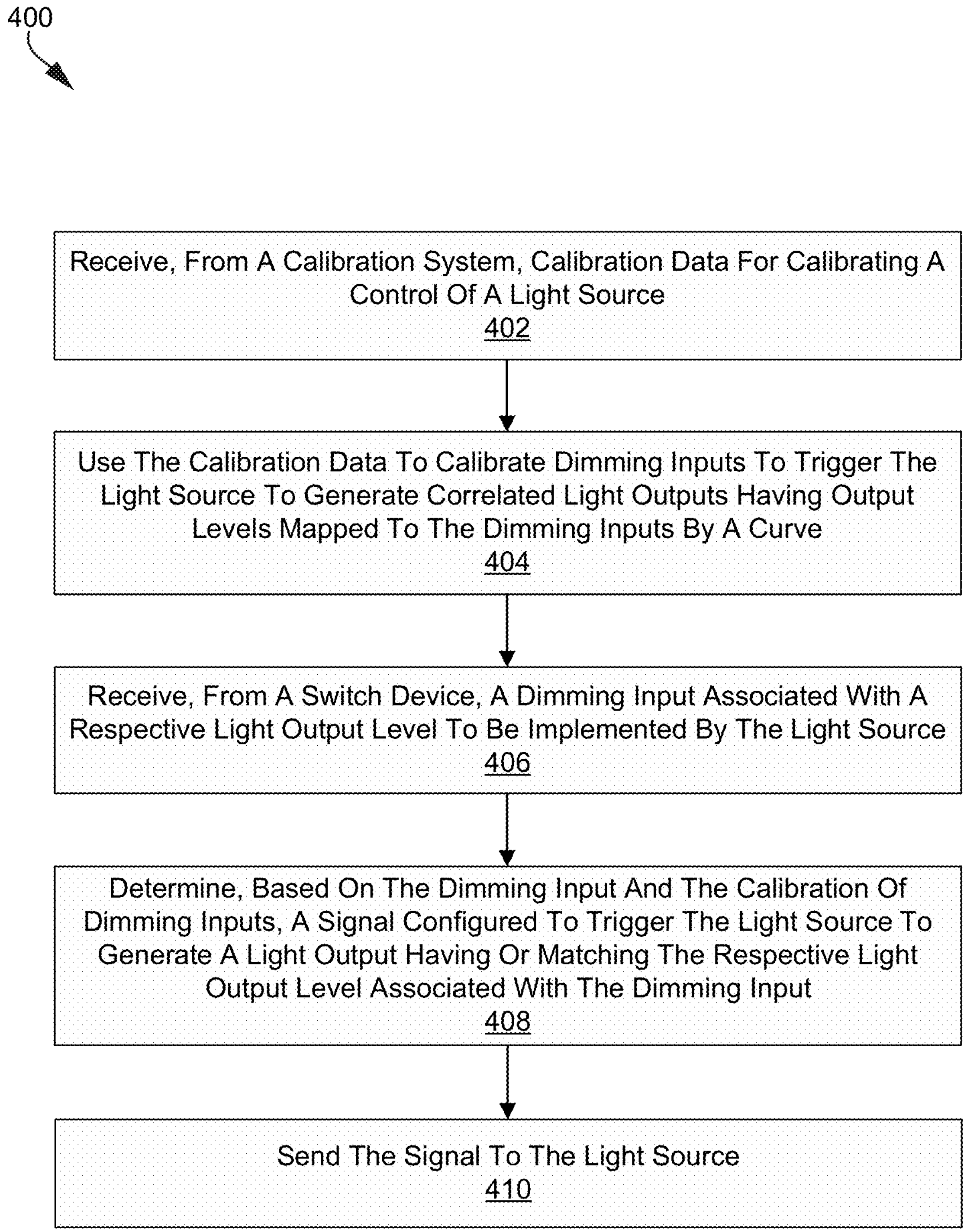

FIG. 4 is a flowchart illustrating another example method 400 for calibrating and controlling light sources and associated outputs in a lightning system (e.g., lightning system 100), according to some examples of the present disclosure. The method 400 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the method 400. Further, some of the steps may be performed simultaneously, or in a different order than shown in FIG. 4, as will be understood by a person of ordinary skill in the art. The method 400 shall be described with reference to FIGS. 1A-1B. However, the method 400 is not limited to those examples.

At step 402, the dimmer device 102 can receive calibration data 144 from the calibration system 140 for calibrating a control of the light source 120. The calibration data 144 can include information and/or calibration parameters that the dimmer device 102 can use to calibrate different dimming inputs and light output levels and/or ensure that the different light output levels (e.g., brightness levels, intensity levels, color levels) that can be generated by the light source 120 in response to different dimming inputs match or are linearly or proportionally related to respective output levels associated with the different dimming inputs (e.g., different, respective output levels correlated to, set for, and/or defined for the different dimming inputs).

For example, the calibration data 144 can include information for calibrating each dimming input possible for controlling the light source 120 (e.g., each possible input at the switch 118 or switch device 116) such that when a user (and/or a device or software) provides a dimming input to the switch 118 (and/or the switch device 116) in order to set a particular output level for the light source 120, the dimming input can be used to control the light source 120 (e.g., indirectly control the light source 120 via a power signal generated from a control signal associated with the dimming input) to emit light with the particular output level associated with that dimming input. In other words, the calibration data 144 can include information for calibrating the different dimming inputs so they can be used to control the light source 120 to generate light outputs having output levels that are more linearly and/or proportionally related to the output levels associated with the different dimming inputs (and set via the different dimming inputs).

In some examples, the calibration data 144 can specify a respective control signal to use to control the light source 120 for each (and/or in response to each) dimming input obtained by the dimmer device 102 (e.g., from the switch 118, the switch device 116, or the dimming unit(s) 110). The dimming inputs can represent inputs used to control the light source 120, including specifying a setting of the light source 120 and/or an output from the light source 120. In some examples, the calibration data 144 can include an indication of each possible dimming input that can be provided to or from a device to control the light source 120, such as the switch 118 or the switch device 116, and can correlate each possible dimming input to a respective light output from the light source 120 and to a respective control signal configured to trigger the light source 120 to generate the respective light output.

In some cases, the calibration data 144 can include a curve plotting a relationship between different light outputs (e.g., different light intensities, brightness levels, colors, etc.) and the possible dimming inputs. In some cases, the calibration data 144 can additionally or alternatively include a mapping of the possible dimming inputs to respective control signals associated with different light outputs generated by the light source 120 (or that can be generated by the light source 120). In some cases, the calibration data 144 can include calibration parameters identifying respective control signals to implement in response to the possible dimming inputs, specifying correlations between different light outputs and the possible dimming inputs, and/or specifying how to modify control signals used to generate the different light outputs to produce the respective control signals associated with the possible dimming inputs.

In some cases, the calibration data 144 can include an output curve that maps different properties of light (e.g., output levels) emitted by the light source 120 to different signals from the switch 118 or the switch device 116 (e.g., different signals representing different dimming inputs provided to the switch 118 or the switch device 116, or different signals generated by the switch 118 or the switch device 116 based on different dimming input provided to the switch 118 or the switch device 116) and/or control signals generated by the dimmer device 102 (e.g., by the controller(s) 112) based on dimming inputs to or from the switch 118 or the switch device 116. The dimmer device 102 can use the different signals to trigger the light source 120 to emit light with different properties corresponding to the different signals as mapped in the output curve. For example, the output curve can map different light intensity levels, brightness levels, and/or colors generated by the light source 120, to the different signals in the output curve, which are used to trigger the light source 120 to emit light with such intensity levels, brightness levels, and/or colors.

At step 404, the dimmer device 102 can use the calibration data 144 to calibrate dimming inputs to trigger the light source 120 to generate correlated light outputs having output levels mapped to the dimming inputs by a curve. For example, the calibration can calibrate each dimming input representing a respective light output level, to generate a signal configured to trigger the light source 120 to generate a light output matching or having the respective light output level associated with that dimming input. As previously noted, the curve can plot the relationship between the dimming inputs and the correlated light outputs from the light source 120.

For example, the curve can plot a relationship between different light outputs generated by the light source 120 (or that can be generated by the light source 120) and different dimming inputs used to control the light source 120. In some cases, the different dimming inputs can include inputs to the switch 118 and/or the switch device 116, and/or signals generated by the switch 118 and/or the switch device 116 based on different inputs. To illustrate, the different dimming inputs can include different inputs provided via the switch 118 or switch inputs to the dimmer device 102 generated by the switch device 116 based on inputs to the switch 118. In some examples, the different dimming inputs can include inputs from the switch 118 or the switch device 116 to the dimmer device 102, which are used to control the light source 120.

In other cases, the different dimming inputs can include input signals generated by the dimmer device 102 from switch signals provided to the dimmer device 102 by the switch 118 or the switch device 116 based on inputs to the switch 118 or the switch device 116. The input signals generated by the dimmer device 102 from the switch signals can include, for example, control signals used by the dimmer device 102 (e.g., by the controller(s) 112 of the dimmer device 102) to generate power signals used by the dimmer device 102 to control the light source 120. In some cases, the different dimming inputs can represent the possible inputs and/or input settings available at a device used to control the light source 120, such as the switch 118, the switch device 116, or the dimmer device 102.

In some examples, the curve plotting the relationship between the different light outputs and different dimming inputs can be or include a linear curve. For example, the different dimming inputs can be linearly related to the different light outputs. In some cases, the relationship between the different light outputs and the different dimming inputs plotted by the curve can create a corresponding relationship between power signals used to generate the different light outputs (e.g., power signals used by dimmer device 102 to control the light source 120) and respective control signals associated with the different dimming inputs and used to generate the power signals. For example, the relationship between the different light outputs from the light source 120 and the different dimming inputs plotted by the curve can be a linear or proportional relationship.

In some examples, the relationship between the different light outputs from the light source 120 and the different dimming inputs as plotted by the curve can be more linear and/or proportional than a different relationship that exists, prior to the calibration, between the different dimming inputs and the actual light outputs generated by the light source 120 in response to the different dimming inputs.

In some examples, the calibration can allow the dimming inputs to control the light source 120 such that when a user (and/or a device or software) provides a dimming input to the switch 118 (and/or the switch device 116) in order to set a particular output level for the light source 120, the dimming input can be used to control the light source 120 (e.g., to indirectly control the light source 120 via a power signal generated from a control signal associated with the dimming input) to emit light with the particular output level associated with that dimming input. In other words, the calibration can calibrate the different dimming inputs so they can be used to control the light source 120 to generate light outputs having output levels that are more linearly and/or proportionally related to the output levels associated with the different dimming inputs (e.g., the output levels represented by the different dimming inputs). Therefore, the user can know that, after such calibration, the light settings defined for the light source 120 via the different dimming inputs (e.g., via dimming inputs to or from the switch 118 and/or the switch device 116) will be more proportionally and/or linearly related to the response (e.g., the light settings) to the different dimming inputs generated by the light source 120, than such dimming inputs are prior to the calibration. Accordingly, the user can avoid common issues with other lightning systems where some dimming inputs to control an output of the light source result in disproportionately larger differences in the output levels generated by the light source than other dimming inputs.

In other words, the user can avoid imprecisions in the responses to dimming inputs used to control the light source such that, for example, an output level of 5 associated with a dimming input used to control the light source may result in a light output from the light source having an output level of approximately 5 and an output level of 4 associated with another dimming input used to control the light source may result in a light output from the light source having an output level of approximately 4, while an output level of 3, for example, associated with a dimming input used to control the light source may undesirably result in a light output from the light source having an output level of 1 or 0 as opposed to 3, such that the dimming input intended to set the output level of the light source to 3 causes a disproportionate change in the output level of the response from the light source relative to the output level of the response from the light source resulting from other inputs used to set other output levels, such as the dimming inputs associated with the output levels of 4 and 5 in the previous example.

At step 406, the dimmer device 102 can receive, from the switch device 116, a dimming input associated with a respective light output level (e.g., brightness level, intensity level, color level, etc.) to be implemented by the light source 120. In some cases, the dimming input can include an input provided to the switch 118 for controlling the light source 120 according to the respective light output level associated with that dimming input. In some cases, the dimming input can represent an input to the dimmer device 102 generated by the switch device 116 based on a signal from the switch 118 generated in response to an input at the switch 118.

At step 408, the dimmer device 102 can determine, based on the dimming input and the calibration of dimming inputs, a signal configured to trigger the light source 120 to generate a light output having or matching the respective light output level associated with the dimming input. In some examples, the signal can include a power signal generated from a control signal associated with the dimming input.

At step 410, the dimmer device 102 can send the signal to the light source 120. The signal can trigger the light source 120 to generate the light output according to the respective light output level associated with the dimming input. For example, if the dimming input represents an input for setting an output level of the light source 120 to 6, the signal can trigger the light source 120 to emit light using the output level of 6 associated with the dimming input.

Figure 5:
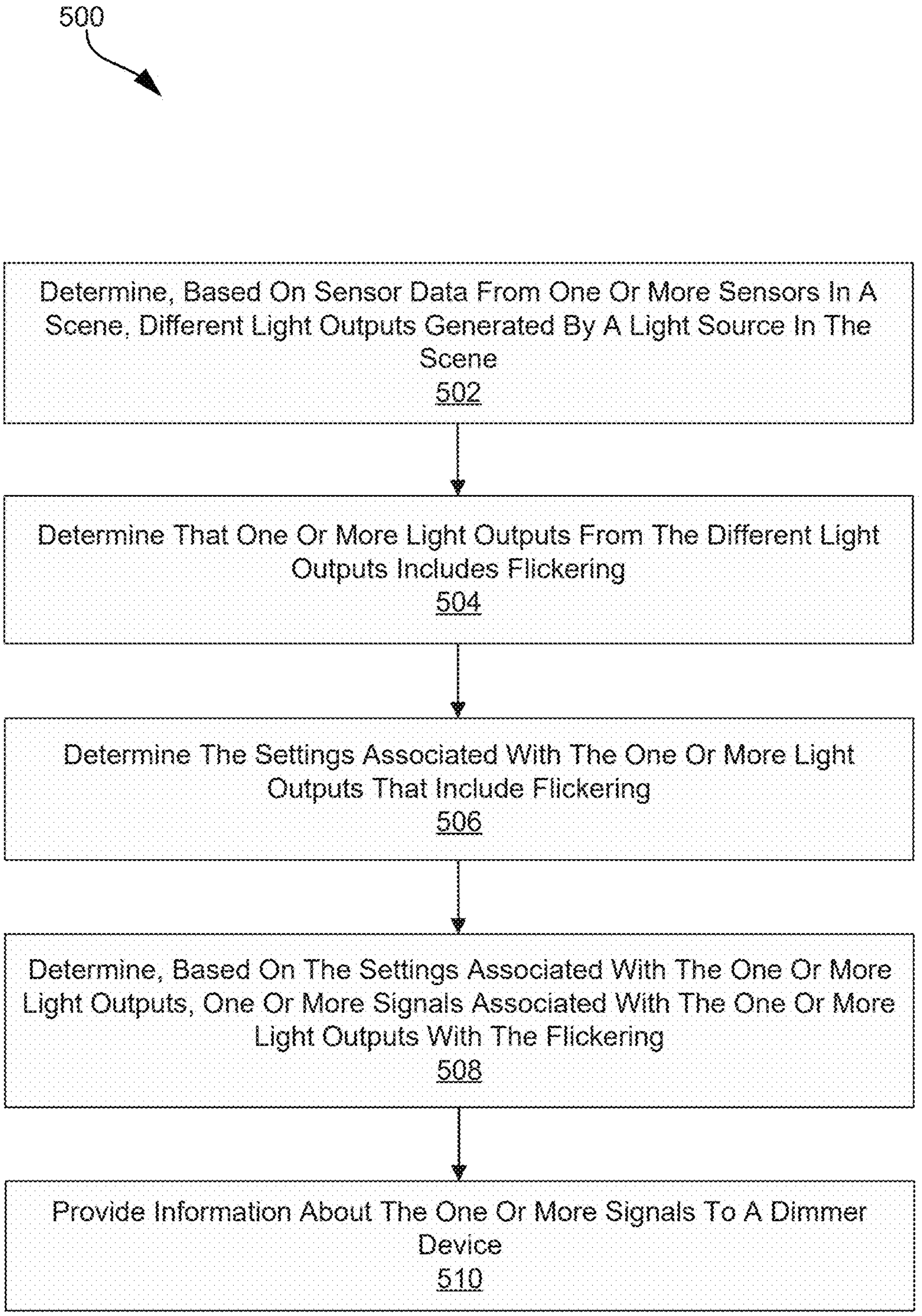
FIG. 5 is a flowchart illustrating an example method for correcting flickering of light outputs from light sources, according to some examples of the present disclosure.

FIG. 5 is a flowchart illustrating an example method 500 for correcting flickering of light outputs from light sources, according to some examples of the present disclosure. The method 500 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the method 500. Further, some of the steps may be performed simultaneously, or in a different order than shown in FIG. 5, as will be understood by a person of ordinary skill in the art. The method 500 shall be described with reference to FIGS. 1A-1B. However, the method 500 is not limited to those examples.

At step 502, the calibration system 140 can determine, based on sensor data 146 from one or more sensors 130 in a scene, different light outputs generated by the light source 120 in the scene. The different light outputs can include different light properties. For example, the different light outputs can include different brightness levels, different intensity levels, and/or different color levels.

At step 504, the calibration system 140 can determine that one or more light outputs from the different light outputs includes flickering. The calibration system 140 can identify the one or more light outputs with the flickering to address the flickering, as further described herein. In some examples, the calibration system 140 can identify any light outputs from the different light outputs that have any flickering at all. In other cases, the calibration system 140 can identify those light outputs from the different light outputs that have more than a threshold amount of flickering. The threshold can specify, for example, the frequency of flickering, the intensity of the flickering, and/or any other flickering characteristic. In some aspects, the one or more light outputs identified as having flickering can depend on a user in the scene of the light source 120 and/or a location of the light source 120. For example, different users and different light source locations may have different preferences, settings, and/or thresholds for addressing (e.g., correcting, preventing, etc.) flickering.

To illustrate, one user may want any flickering to be corrected when such user is in the scene of the light source 120, in which case the calibration system 140 can identify any light outputs that have any flickering. On the other hand, another user may be willing to accept a threshold amount of flickering, in which case the calibration system 140 may identify light outputs that have the threshold amount of flickering. As another example, the calibration system 140 may be configured to implement lower flickering thresholds for light sources located in certain scenes than light sources located in other scenes. For example, the calibration system 140 may implement a lower flickering threshold when identifying flickering light outputs in scenes associated with safety issues, such as stairwells or hallways, than flickering light outputs in other scenes such as streets, basements, etc. Thus, the location of the light source can affect the threshold used by the calibration system 140 to determine whether a light output has sufficient flickering.

At step 506, the calibration system 140 can determine the settings associated with the one or more light outputs that include flickering. For example, the calibration system 140 can determine the control signals and/or the power signals used to trigger the light source 120 to generate the one or more light outputs with the flickering. Here, the control signals and/or power signals can represent the settings associated with the one or more light outputs that include flickering. As another example, the calibration system 140 can additionally or alternatively determine the calibration system 140 can determine the output levels (e.g., brightness levels, intensity levels, color levels) of the one or more light outputs with the flickering. The output levels can represent the settings associated with the one or more light outputs. The calibration system 140 can determine the output levels based on sensor data 146 from the one or more sensors 130 that depict or measure the output levels of the one or more light outputs.

At step 508, the calibration system 140 can determine, based on the settings associated with the one or more light outputs, one or more signals associated with the one or more light outputs with the flickering. The calibration system 140 can determine the one or more signals so those signals can be excluded from a set of signals used to control the light source 120. The one or more signals can represent one or more control and/or power signals used to trigger the light source 120 to generate the one or more light outputs with the flickering, and the set of signals can include the different control and/or power signals that can be used to control the light source 120 to generate the different light outputs.

At step 510, the calibration system 140 can provide information about the one or more signals to the dimmer device 102. For example, the calibration system 140 can provide an indication and/or description of the one or more signals. The dimmer device 102 can use such information to prevent the light source 120 from being controlled using such one or more signals and thus prevent the light source 120 from generating the one or more light outputs with the flickering. In some cases, the information about the one or more signals can include a request or instruction to the dimmer device 102 indicating that the one or more signals should not be used to control the light source 120.

Example Computer System

Figure 6:
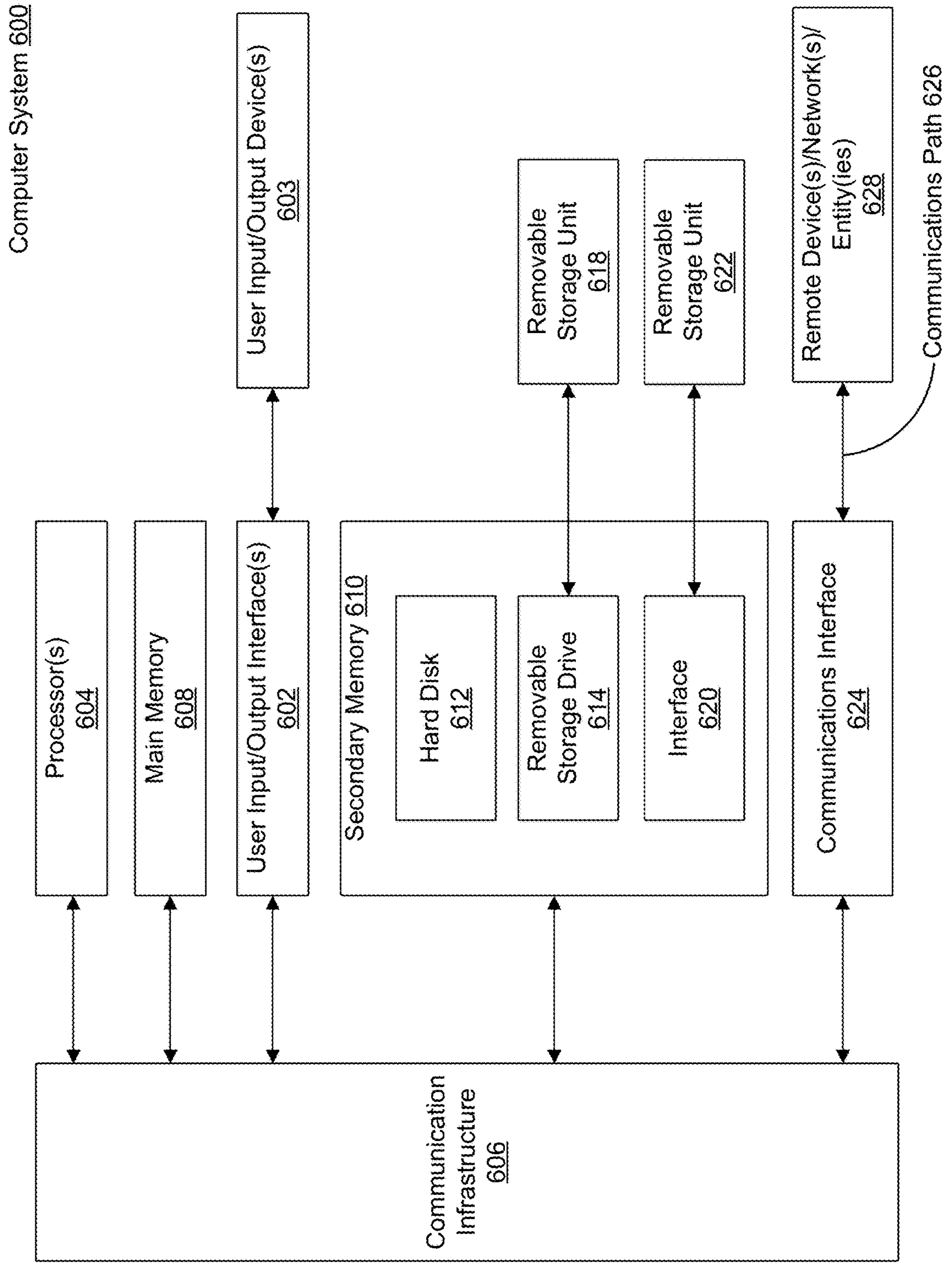
FIG. 6 illustrates an example computer system that can be used for implementing various aspects of the present disclosure.

Various aspects and examples may be implemented, for example, using one or more well-known computer systems, such as computer system 600 shown in FIG. 6. For example, the dimmer device 102, the calibration system 140 and/or any device(s) or component in the lightning system 100 may be implemented using combinations or sub-combinations of computer system 600. Also or alternatively, computer system 600 may be used, for example, to implement any of the aspects and examples discussed herein, as well as combinations and sub-combinations thereof.

Computer system 600 may include one or more processors (e.g., central processing units or CPUs), such as processor 604. Processor 604 may be connected to a communication infrastructure 606 (or communication bus).

Computer system 600 may also include user input/output device(s) 603, such as monitors, keyboards, pointing devices, etc., which may communicate with communication infrastructure 606 through user input/output interface(s) 602.

In some examples, the one or more processors 604 may include a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc. In other examples, the one or more processors 604 may additionally or alternatively include or be part of a digital signal processor (DSP), an image signal processor (ISP), an application-specific integrated circuit (ASIC), a field-programmable gate array (FPGA), an integrated circuit, a microcontroller, and/or any other processing device.

Computer system 600 may also include a main or primary memory 608, such as random access memory (RAM). Main memory 608 may include one or more levels of cache. Main memory 608 may have stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may include a communication or network interface 624. Communication interface 624 may enable computer system 600 to communicate and interact with any combination of external devices, external networks, external entities, etc. (individually and collectively referenced by reference number 628). For example, communication interface 624 may allow computer system xx00 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, mobile phone (e.g., smartphone), smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: memory; and one or more processors coupled to the memory and configured to perform operations comprising: determining, based on sensor data from one or more sensors in a scene, different light outputs generated by a light source in the scene, the different light outputs comprising at least one of different brightness levels, different intensity levels, and different color levels; determining a curve plotting a relationship between the different light outputs and different dimming inputs used to control the light source; based on the curve plotting the relationship between the different light outputs and the different dimming inputs, mapping the different dimming inputs to respective control signals configured to trigger the light source to generate the different light outputs, wherein the mapping of the different dimming inputs to respective control signals correlates each dimming input from the different dimming inputs to a respective light output from the different light outputs and to a respective control signal configured to trigger the light source to generate the respective light output; and based on the mapping of the different dimming inputs to the respective control signals, calibrating each dimming input from the different dimming inputs to control the light source to generate the respective light output associated with that dimming input based on the respective control signal correlated to that dimming input.

Aspect 2. The system of Aspect 1, wherein calibrating each dimming input comprises: providing, to a dimmer configured to control the light source, calibration data specifying each respective control signal to use to control the light source in response to each dimming input from the different dimming inputs.

Aspect 3. The system of any of Aspects 1 to 2, wherein the different dimming inputs comprise different inputs provided via a switch communicatively coupled to the dimmer, and wherein the different dimming inputs are associated with at least one of different brightness levels, different intensity levels, and different colors.

Aspect 4. The system of any of Aspects 1 to 3, wherein the curve plotting the relationship between the different light outputs and different dimming inputs comprises a linear curve, and wherein the different dimming inputs are linearly related to the different light outputs.

Aspect 5. The system of any of Aspects 1 to 4, wherein the mapping of the different dimming inputs to the respective control signals further maps the respective control signals to power signals used to control the light source to generate the different light outputs.

Aspect 6. The system of any of Aspects 1 to 5, further comprising at least one of a dimmer used to control the light source, the one or more sensors, and a switch communicatively coupled to the dimmer.

Aspect 7. The system of any of Aspects 1 to 6, wherein the one or more sensors comprise at least one of a color sensor, an image sensor, a light sensor, a photodiode, a photodiode sensor, and a phototransistor, and wherein the light source comprises at least one of a light-emitting diode (LED), an incandescent light, a halogen light, a metal halide light, and a fluorescent light.

Aspect 8. The system of any of Aspects 1 to 7, wherein the one or more processors are configured to perform operations further comprising: in response to receiving the dimming input from the different dimming inputs, determining the respective control signal correlated to the dimming input; based on the respective control signal, generating a power signal configured to trigger the light source to generate the respective light output associated with the dimming input, the respective light output comprising at least one of a brightness level associated with the dimming input, an intensity level associated with the dimming input, and a color associated with the dimming input; and sending the power signal to the light source.

Aspect 9. A computer-implemented method comprising: determining, based on sensor data from one or more sensors in a scene, different light outputs generated by a light source in the scene, the different light outputs comprising at least one of different brightness levels, different intensity levels, and different color levels; determining a curve plotting a relationship between the different light outputs and different dimming inputs used to control the light source; based on the curve plotting the relationship between the different light outputs and the different dimming inputs, mapping the different dimming inputs to respective control signals configured to trigger the light source to generate the different light outputs, wherein the mapping of the different dimming inputs to respective control signals correlates each dimming input from the different dimming inputs to a respective light output from the different light outputs and to a respective control signal configured to trigger the light source to generate the respective light output; and based on the mapping of the different dimming inputs to the respective control signals, calibrating each dimming input from the different dimming inputs to control the light source to generate the respective light output associated with that dimming input based on the respective control signal correlated to that dimming input.

Aspect 10. The computer-implemented method of Aspect 9, wherein calibrating each dimming input comprises: providing, to a dimmer configured to control the light source, calibration data specifying each respective control signal to use to control the light source in response to each dimming input from the different dimming inputs.

Aspect 11. The computer-implemented method of Aspect 10, wherein the different dimming inputs comprise different inputs provided via a switch communicatively coupled to the dimmer.

Aspect 12. The computer-implemented method of any of Aspects 9 to 11, wherein the curve plotting the relationship between the different light outputs and different dimming inputs comprises a linear curve, and wherein the different dimming inputs are linearly related to the different light outputs.

Aspect 13. The computer-implemented method of any of Aspects 9 to 12, wherein the mapping of the different dimming inputs to the respective control signals further maps the respective control signals to power signals used to control the light source to generate the different light outputs.

Aspect 14. The computer-implemented method of any of Aspects 9 to 13, wherein the one or more sensors comprise at least one of a color sensor, an image sensor, a light sensor, a photodiode, a photodiode sensor, and a phototransistor.

Aspect 15. The computer-implemented method of any of Aspects 9 to 14, wherein the light source comprises at least one of a light-emitting diode (LED), an incandescent light, a halogen light, a metal halide light, and a fluorescent light.

Aspect 16. The computer-implemented method of any of Aspects 9 to 15, further comprising: in response to receiving the dimming input from the different dimming inputs, determining the respective control signal correlated to the dimming input; based on the respective control signal, generating a power signal configured to trigger the light source to generate the respective light output associated with the dimming input, the respective light output comprising at least one of a brightness level associated with the dimming input, an intensity level associated with the dimming input, and a color associated with the dimming input; and sending the power signal to the light source.

Aspect 17. A non-transitory computer-readable medium having instructions stored thereon that, when executed by one or more processors, cause the one or more processors to perform a method according to any of Aspects 9 to 16.

Aspect 18. A system comprising means for performing a method according to any of Aspects 9 to 16.

Aspect 19. A computer-program product comprising executable instructions which, when executed by one or more processors, cause the one or more processors to perform a method according to any of Aspects 9 to 16.

What is claimed is:

1. A system comprising:

memory; and one or more processors coupled to the memory and configured to perform operations comprising:

determining, based on sensor data from one or more sensors in a scene, different light outputs generated by a light source in the scene, the different light outputs comprising at least one of different brightness levels, different intensity levels, and different color levels;

determining a curve plotting a relationship between the different light outputs and different dimming inputs used to control the light source, wherein the curve comprises a linear curve and wherein the different dimming inputs are linearly related to the different light outputs;

based on the curve plotting the relationship between the different light outputs and the different dimming inputs, mapping the different dimming inputs to respective control signals configured to trigger the light source to generate the different light outputs, wherein the mapping of the different dimming inputs to respective control signals correlates each dimming input from the different dimming inputs to a respective light output from the different light outputs and to a respective control signal configured to trigger the light source to generate the respective light output; and based on the mapping of the different dimming inputs to the respective control signals, calibrating each dimming input from the different dimming inputs to control the light source to generate the respective light output associated with that dimming input based on the respective control signal correlated to that dimming input.

2. The system of claim 1, wherein calibrating each dimming input comprises:

providing, to a dimmer configured to control the light source, calibration data specifying each respective control signal to use to control the light source in response to each dimming input from the different dimming inputs.

3. The system of claim 1, wherein the different dimming inputs comprise different inputs provided via a switch communicatively coupled to the dimmer, and wherein the different dimming inputs are associated with at least one of different brightness levels, different intensity levels, and different colors.

4. The system of claim 1, wherein the mapping of the different dimming inputs to the respective control signals further maps the respective control signals to power signals used to control the light source to generate the different light outputs.

5. The system of claim 1, further comprising at least one of a dimmer used to control the light source, the one or more sensors, and a switch communicatively coupled to the dimmer.

6. The system of claim 1, wherein the one or more sensors comprise at least one of a color sensor, an image sensor, a light sensor, a photodiode, a photodiode sensor, and a phototransistor, and wherein the light source comprises at least one of a light-emitting diode (LED), an incandescent light, a halogen light, a metal halide light, and a fluorescent light.

7. The system of claim 1, wherein the one or more processors are configured to perform operations further comprising:

in response to receiving the dimming input from the different dimming inputs, determining the respective control signal correlated to the dimming input;

based on the respective control signal, generating a power signal configured to trigger the light source to generate the respective light output associated with the dimming input, the respective light output comprising at least one of a brightness level associated with the dimming input, an intensity level associated with the dimming input, and a color associated with the dimming input; and sending the power signal to the light source.

8. A computer-implemented method comprising:

determining, based on sensor data from one or more sensors in a scene, different light outputs generated by a light source in the scene, the different light outputs comprising at least one of different brightness levels, different intensity levels, and different color levels;

determining a curve plotting a relationship between the different light outputs and different dimming inputs used to control the light source, wherein the curve comprises a linear curve and wherein the different dimming inputs are linearly related to the different light outputs;

based on the curve plotting the relationship between the different light outputs and the different dimming inputs, mapping the different dimming inputs to respective control signals configured to trigger the light source to generate the different light outputs, wherein the mapping of the different dimming inputs to respective control signals correlates each dimming input from the different dimming inputs to a respective light output from the different light outputs and to a respective control signal configured to trigger the light source to generate the respective light output; and based on the mapping of the different dimming inputs to the respective control signals, calibrating each dimming input from the different dimming inputs to control the light source to generate the respective light output associated with that dimming input based on the respective control signal correlated to that dimming input.

9. The computer-implemented method of claim 8, wherein calibrating each dimming input comprises:

providing, to a dimmer configured to control the light source, calibration data specifying each respective control signal to use to control the light source in response to each dimming input from the different dimming inputs.

10. The computer-implemented method of claim 9, wherein the different dimming inputs comprise different inputs provided via a switch communicatively coupled to the dimmer.

11. The computer-implemented method of claim 8, wherein the mapping of the different dimming inputs to the respective control signals further maps the respective control signals to power signals used to control the light source to generate the different light outputs.

12. The computer-implemented method of claim 8, wherein the one or more sensors comprise at least one of a color sensor, an image sensor, a light sensor, a photodiode, a photodiode sensor, and a phototransistor.

13. The computer-implemented method of claim 8, wherein the light source comprises at least one of a light-emitting diode (LED), an incandescent light, a halogen light, a metal halide light, and a fluorescent light.

14. The computer-implemented method of claim 8, further comprising: in response to receiving the dimming input from the different dimming inputs, determining the respective control signal correlated to the dimming input, based on the respective control signal, generating a power signal configured to trigger the light source to generate the respective light output associated with the dimming input, the respective light output comprising at least one of a brightness level associated with the dimming input, an intensity level associated with the dimming input, and a color associated with the dimming input; and sending the power signal to the light source.

15. A non-transitory computer-readable medium having instructions stored thereon that, when executed by one or more processors, cause the one or more processors to perform operations comprising:

determining, based on sensor data from one or more sensors in a scene, different light outputs generated by a light source in the scene, the different light outputs comprising at least one of different brightness levels, different intensity levels, and different color levels;

determining a curve plotting a relationship between the different light outputs and different dimming inputs used to control the light source, wherein the curve comprises a linear curve and wherein the different dimming inputs are linearly related to the different light outputs;

based on the curve plotting the relationship between the different light outputs and the different dimming inputs, mapping the different dimming inputs to respective control signals configured to trigger the light source to generate the different light outputs, wherein the mapping of the different dimming inputs to respective control signals correlates each dimming input from the different dimming inputs to a respective light output from the different light outputs and to a respective control signal configured to trigger the light source to generate the respective light output; and based on the mapping of the different dimming inputs to the respective control signals, calibrating each dimming input from the different dimming inputs to control the light source to generate the respective light output associated with that dimming input based on the respective control signal correlated to that dimming input.

16. The computer-implemented method of claim 15, wherein the different dimming inputs comprise different inputs provided via a switch communicatively coupled to a dimmer used to control the light source, and wherein the one or more sensors comprise at least one of a color sensor, an image sensor, a light sensor, a photodiode, a photodiode sensor, and a phototransistor.

17. The non-transitory computer-readable medium of claim 15, wherein the mapping of the different dimming inputs to the respective control signals further maps the respective control signals to power signals used to control the light source to generate the different light outputs.

* * * * *